US011567897B2

(12) United States Patent
Hofverberg et al.

(10) Patent No.: US 11,567,897 B2
(45) Date of Patent: Jan. 31, 2023

(54) MEDIA CONTENT PLAYBACK WITH STATE PREDICTION AND CACHING

(71) Applicant: Spotify AB, Stockholm (SE)

(72) Inventors: Simon Hofverberg, Gothenburg (SE); Fredrik Schmidt, Stockholm (SE); Johan Oskarsson, Stockholm (SE); Ariel Marcus, New York, NY (US); Chris Doyle, New York, NY (US); Joseph Tam, San Francisco, CA (US); Minchull Kim, New York, NY (US)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 17/395,955

(22) Filed: Aug. 6, 2021

(65) Prior Publication Data
US 2022/0066981 A1 Mar. 3, 2022

Related U.S. Application Data

(63) Continuation of application No. 16/394,528, filed on Apr. 25, 2019, now Pat. No. 11,113,230, which is a continuation of application No. 15/721,138, filed on Sep. 29, 2017, now Pat. No. 10,311,012.

(60) Provisional application No. 62/441,257, filed on Dec. 31, 2016.

(51) Int. Cl.
*G06F 15/167* (2006.01)
*G06N 5/02* (2006.01)
*G06F 12/0888* (2016.01)
*H04N 21/231* (2011.01)
*H04L 67/5681* (2022.01)
*G06F 12/14* (2006.01)

(52) U.S. Cl.
CPC ........ *G06F 15/167* (2013.01); *G06F 12/0888* (2013.01); *G06F 12/1408* (2013.01); *G06N 5/02* (2013.01); *H04L 67/5681* (2022.05); *H04N 21/23106* (2013.01); *G06F 2212/602* (2013.01); *G06F 2212/603* (2013.01)

(58) Field of Classification Search
CPC ............ G06F 12/0888; G06F 12/1408; G06F 2212/603; H04L 67/5681; H04N 21/23106
See application file for complete search history.

(56) References Cited

U.S. PATENT DOCUMENTS

| 6,678,793 | B1 | 1/2004 | Doyle |
| 7,035,863 | B2 | 4/2006 | Kurapati et al. |
| 8,195,635 | B1 | 6/2012 | Lee et al. |
| 8,762,482 | B2 | 6/2014 | Raghunathan et al. |
| 9,110,902 | B1 * | 8/2015 | Dorwin ................. G06F 21/602 |

(Continued)

FOREIGN PATENT DOCUMENTS

EP 1483689 12/2004

OTHER PUBLICATIONS

European Communication in Application 17210871.4, dated Mar. 27, 2020, 4 pages.

(Continued)

*Primary Examiner* — Aracelis Ruiz
(74) *Attorney, Agent, or Firm* — Merchant & Gould P.C.

(57) ABSTRACT

Systems, devices, apparatuses, components, methods, and techniques for predicting user and media-playback device states are provided. Systems, devices, apparatuses, components, methods, and techniques for representing cached, user-selected, and streaming content are also provided.

21 Claims, 12 Drawing Sheets

(56) References Cited

U.S. PATENT DOCUMENTS

| | | |
|---|---|---|
| 9,124,642 B2 | 9/2015 | Choudhury et al. |
| 9,462,313 B1 | 10/2016 | Sbaiz et al. |
| 9,544,388 B1 | 1/2017 | Li et al. |
| 9,742,861 B2 | 8/2017 | Harrang et al. |
| 9,742,871 B1 | 8/2017 | Gibson et al. |
| 9,819,978 B2 | 11/2017 | Park et al. |
| 9,832,251 B2 | 11/2017 | Ljung |
| 10,311,012 B2 | 6/2019 | Hofverberg |
| 11,113,230 B2 | 9/2021 | Hofverberg |
| 2002/0133633 A1 | 9/2002 | Kumar |
| 2005/0091337 A1 | 4/2005 | Reasor |
| 2005/0108322 A1 | 5/2005 | Kline |
| 2009/0060453 A1 | 3/2009 | Kellogg |
| 2009/0094257 A1 | 4/2009 | Nissen |
| 2009/0150970 A1 | 6/2009 | Hinds |
| 2009/0287406 A1 | 11/2009 | Ohi |
| 2010/0005046 A1 | 1/2010 | Segel |
| 2010/0197236 A1 | 8/2010 | Kawamura |
| 2010/0240346 A1 | 9/2010 | Jain et al. |
| 2010/0246826 A1 | 9/2010 | Ogura |
| 2011/0030010 A1 | 2/2011 | Overbaugh |
| 2011/0167128 A1 | 7/2011 | Raghunathan et al. |
| 2012/0011425 A1 | 1/2012 | Banker |
| 2012/0192217 A1 | 7/2012 | Jeong et al. |
| 2013/0047084 A1 | 2/2013 | Sanders et al. |
| 2013/0151659 A1 | 6/2013 | Alberth |
| 2014/0047350 A1 | 2/2014 | Kim et al. |
| 2014/0095943 A1 | 4/2014 | Kohlenberg et al. |
| 2014/0227964 A1 | 8/2014 | Cox et al. |
| 2015/0150062 A1 | 5/2015 | Guerrera et al. |
| 2015/0365450 A1 | 12/2015 | Gaunt et al. |
| 2016/0119678 A1 | 4/2016 | Ordyna |
| 2016/0197975 A1 | 7/2016 | Law |
| 2016/0232451 A1 | 8/2016 | Scherzer |
| 2017/0032256 A1 | 2/2017 | Otto |
| 2017/0078729 A1 | 3/2017 | Karlsson et al. |
| 2017/0142219 A1 | 5/2017 | Li et al. |

OTHER PUBLICATIONS

European Communication in Application 17210871.4, dated Jun. 23, 2020, 4 pages.

European Extended Search Report in Application 17210871.4, dated May 2, 2018, 8 pages.

European Result of Consulation in Application 17210871.4, dated Sep. 11, 2020, 3 pages.

European Result of Consulation in Application 17210871.4, dated Sep. 14, 2020, 3 pages.

Borkowski et al., "Prediction-Based Prefetch Scheduling in Mobile Service Applications," IEEE International Conference on Mobile Services, pp. 41-48, 2016.

Kumar, "How Google is planning to use your location to create the perfect playlist", 3 pages, Nov. 15, 2016, http: <URL: http://geoawesomeness.com/google-planning-use-location-create-perfect-pla-ylist.

Yam, "The Next Chrome Will Load Your Next Link for You," Tom's Guide, 2 pages, Jun. 17, 2011.

* cited by examiner

MEDIA CONTENT PLAYBACK WITH STATE PREDICTION AND CACHING

CROSS-REFERENCE TO RELATED APPLICATIONS

This application is a Continuation of U.S. application Ser. No. 16/394,528, filed Apr. 25, 2019, which is a Continuation of U.S. application Ser. No. 15/721,138 filed on Sep. 29, 2017, issued as U.S. Pat. No. 10,311,012, which claims the benefit of U.S. Provisional Application No. 62/441,257, filed on Dec. 31, 2016, the disclosures of which are hereby incorporated by reference in their entireties. To the extent appropriate, a claim of priority is made to each of the above-disclosed applications.

BACKGROUND

Many people enjoy consuming media content while travelling or during other activities. The media content can include audio content, video content, or other types of media content. Examples of audio content include songs, albums, podcasts, audiobooks, etc. Examples of video content include movies, music videos, television episodes, etc. Using a mobile phone or other media-playback device, such as a vehicle-integrated media-playback device, a person can access large catalogs of media content. For example, a user can access an almost limitless catalog of media content through various free and subscription-based streaming services. Additionally, a user can store a large catalog of media content on his or her mobile device.

This nearly limitless access to media content introduces new challenges for users. For example, it may be difficult for a user to access media content at certain times, such as during a time of poor Internet connectivity. Further, while the ability of media-playback devices to store content has increased, the amount of available content to play far exceeds the storage capabilities of media-playback devices. This can create difficulties when a user desires to play a media content item that is not stored on a device at a time when it is difficult for a user to access media content.

SUMMARY

In general terms, this disclosure is directed to media content item caching. Various aspects are described in this disclosure, which include, but are not limited to, a media-playback device that predicts one or more future states of the device and updates caching parameters based on properties of the one or more future states. Other aspects include the following.

One aspect is a method of media content item caching on a media-playback device, the method comprising: predicting whether a media-playback device will enter a predetermined state; selecting uncached media content items based at least in part on predicted qualities of the predetermined state, wherein the selected uncached media content items are not cached on the media-payback device; and caching, at the media-playback device, one or more of the selected media content items prior to the media-playback device entering the predetermined state or while the media-playback device is in the predetermined state.

Another aspect is a media-playback device comprising: a media output device that plays media content items; a cache storing media content items or media content keys; a processor; and at least one non-transitory computer readable data storage device storing instructions that, when executed by the processor, cause the media-playback device to: predict whether the media-playback device is in a predetermined state or will enter a predetermined state within a threshold period of time; select one or more of the cached media content items or one or more of the cached media content keys responsive to predicting that the media-playback device is in a predetermined state or will enter a predetermined state within a threshold period of time; and during a maintenance operation on the cache, prevent the selected one or more of the cached media content items or one or more of the cached media content keys from being removed from the cache.

A further aspect is a media-playback device comprising: a media output device that plays media content items; a cache storing media content items or media content keys; a caching engine configured to curate the storage of media content items or media content keys in the cache according to caching parameters; and at least one non-transitory computer readable data storage device storing instructions that, when executed by a processor, cause the media-playback device to: predict whether the media-playback device is in a predetermined state or will enter a predetermined state within a threshold period of time; and modify at least one of the caching parameters responsive to predicting that the media-playback device is in a predetermined state or will enter a predetermined state within a threshold period of time.

Yet another aspect is a computer readable data storage device storing data instructions that, when executed by a processing device, cause the processing device to: predict that a media-playback device will enter a predetermined state; select a set of media content items based at least in part on predicted qualities of the predetermined state, wherein the selected media content items are not cached on the media-payback device; and caching, at the media-playback device, one or more of the selected set of media content items after predicting that the media-playback device will enter the predetermined state.

A further aspect is a computer readable data storage device storing data instructions that, when executed by a processing device, cause the processing device to: predict that a media-playback device will enter a predetermined state; select one or more cached data items after the prediction, the cached data items comprising at least one of: media content items and media content keys; and during a maintenance operation on the cache, prevent the selected one or more cached data items from being removed from the cache. In another aspect, the prediction can occur after the media-playback device has entered the predetermined state.

Another aspect is a computer readable data storage device storing data instructions that, when executed by a processing device, cause the processing device to: determine that a media-playback device is in a predetermined state; modify a caching parameter based on the determination; and manage cached data items based on the modified caching parameter, wherein the cached data items comprise at least one of: media content items and media content keys.

DETAILED DESCRIPTION

Figure 1:
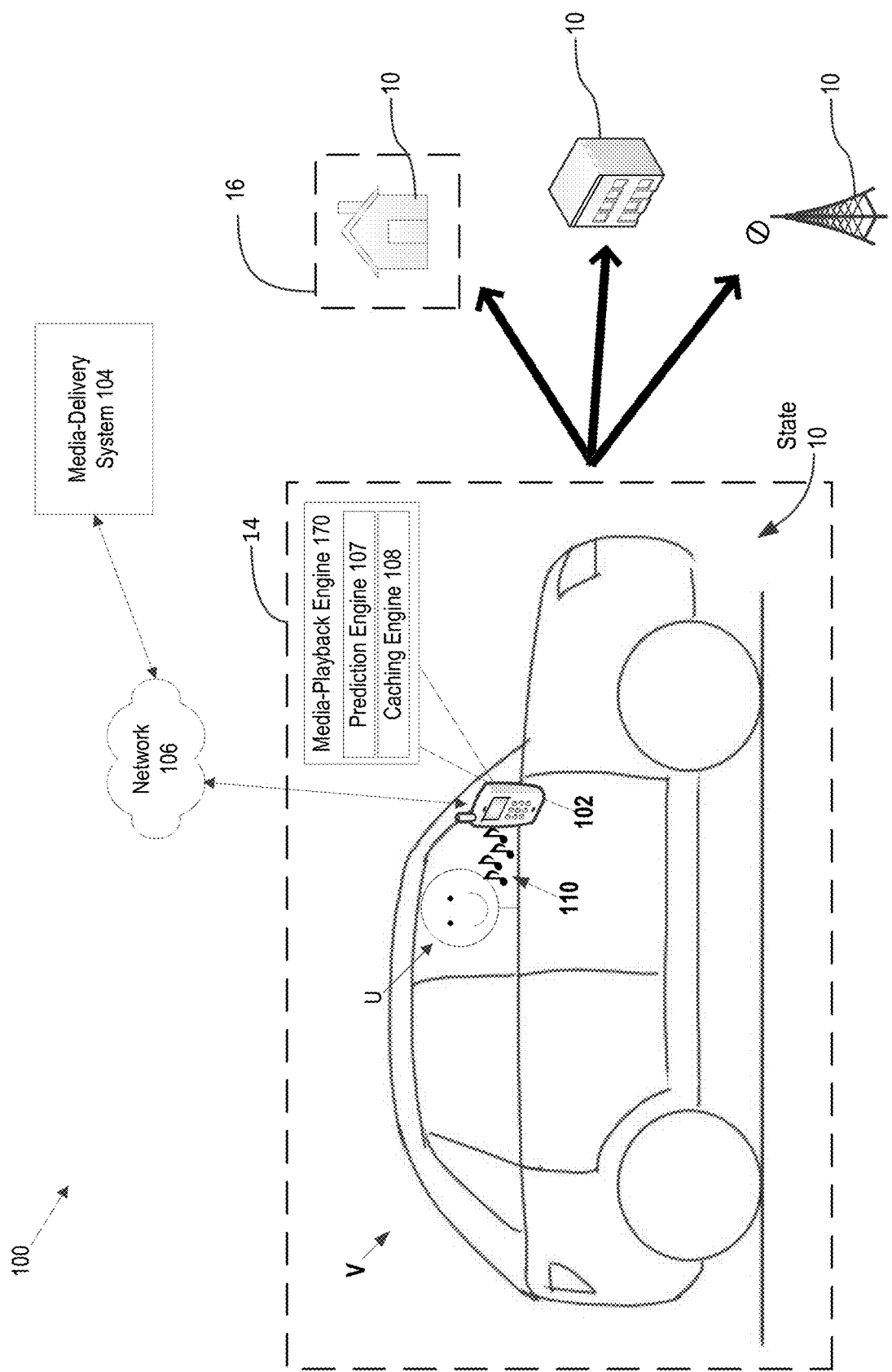
FIG. 1 illustrates an example system for media content caching and state prediction.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Mobile phones, tablets, computers, speakers, and other devices or systems can be used as media-playback devices to consume media content. Consuming media content may include one or more of listening to audio content, watching video content, or consuming other types of media content. For ease of explanation, the embodiments described in this application are presented using specific examples. For example, audio content (and in particular music) is described as an example of one form of media consumption. As another example, travelling (and in particular driving) is described as one example of an activity during which media content is consumed. However, it should be understood that the same concepts are similarly applicable to other forms of media consumption and to other activities, and at least some embodiments include other forms of media consumption and/or are configured for use during other activities.

Users often consume media content during various activities, which can be described as the users being in particular states. Here, the term "state" and its variants refer to a particular condition that a user and/or media-playback device is in at a particular time. For example, while at home, the user can be described as being in a "home state." While at work, the user can be described as being in a "work state." States need not be limited to location of the user. They can also describe an activity the user is performing (e.g., an exercising state, a studying state, a cooking state, etc.), a condition of the media-playback device (e.g., Internet connectivity, Internet connectivity speed, Internet connectivity cost, Internet connectivity level, Internet connectivity type, Internet connectivity reliability, or battery level, storage space, etc.), and so on. There can be more than one state at a time. For example, while a user is cooking dinner at home and charging the media-playback device, there can simultaneously be a home state, a cooking state, and a charging state. Each state can carry its own characteristics. For example, a home state may indicate that the media-playback device has strong Internet connectivity. As another example, an exercise state may indicate that the user may want to listen to a particular kind of music. The characteristics of states can be unique to a user (e.g., one user may have a strong Internet connection at work while another has a weak connection) or can be shared by users (e.g., users in a home state tend to have strong Internet connections).

Different states can present different challenges to enjoying media content. For example, enjoying media content while travelling can present several challenges. First, it can be difficult to safely interact with a media-playback device while in certain states, such as in a travel state where interactions with a media-playback device can interfere with travel related activities (e.g., driving, navigating, etc.). Second, desired media content may not be available or accessible in a format that can be accessed while in certain states. For example, streaming media content can be unavailable in states with low or no Internet connectivity. Third, accessing media content while travelling may be difficult, expensive, or impossible depending on network availability/capacity in a particular state. For example, along a route of travel, Internet connectivity may be inconsistent. Fourth, accessing and playing back media content can require significant amounts of energy, potentially draining a battery in the media-playback device. Fifth, it can be challenging to connect a media-playback device to an audio system for playback in certain states. For example, in a travel state, it can be difficult for a media-playback device to connect to a vehicle-embedded audio system. Embodiments disclosed herein address some or all of these challenges. It should be understood, however, that aspects described herein are not limited to use during or with reference to particular states.

Knowing a current state of a user, can be helpful in providing an improved user experience. For example, by knowing a state of the user, media-playback device, or system, media content items can be selected according what the user may prefer during that particular state. As another example, knowing that a state has (or tends to have) particular characteristics, the media-playback device can leverage those characteristics to provide an improved user experience. For instance, knowing that a user often plays media content items using a high-quality stereo system while at home (e.g., in a home state), the media-playback device can increase the quality at which it streams media content items in order to take advantage of the available high-quality stereo system.

It can also be advantageous for a media-playback device to anticipate what kind of state will exist in the near future. Data mining, data analysis, machine learning, and other techniques can be used to intelligently pre-load content for the user to enjoy while in particular future states. The media-playback device can take steps to prepare a positive user experience for that state, such as by curating or otherwise managing a content cache for that state. For example, a media-playback device may predict that the user will enter a travel state, and select media content items that the user may want to play during that state. These selected media content items can then be proactively cached to the device and already-cached content can be preserved. If the user then requests that these media content items be played in the future state, then the media-playback device can respond to the request using fewer resources (e.g., networking, processor, and battery resources), thereby providing an improved user experience.

It can also be advantageous for a user to be able to play media content items stored on a device while in a state having limited network connectivity. During poor network connectivity, playback can be limited to media content items stored locally on the media-playback device because network resources are too limited to, for example, stream media content items from a remote device or server. Media-playback devices can give users the option of selecting media content items for storage on the playback device, so the items are available for playback directly from the device. Media-playback devices can also cache media content items as part of the playback process. For example, the media-playback device can store recently-played media content items in a cache so the cached media content item can be readily played at a later time. However, traditional media-playback devices do not allow users to play back cached media content items while in offline state.

FIG. 1 illustrates an example media content playback system 100 for media content caching and state prediction using a media-playback device 102. The example system 100 can also include a media-delivery system 104. The media-playback device 102 includes a media-playback engine 170 having a prediction engine 107 and a caching engine 108. The system 100 communicates across a network 106.

At a particular time, the media content playback system 100, media-playback device 102, and a user U can be considered as being in a particular state 10. The state 10 reflects the particular condition that the user, media-playback device, or system is in at a specific time. A state 10 at current moment can be referred to as a current state 14. As illustrated in the example of FIG. 1, the user U is traveling in a vehicle V, and the current state 14 can be considered a travel state. States 10 can be transitory and another state 10 can follow the current state 14. The state 10 that is predicted to follow the current state 14 can be considered a predicted future state 16. As illustrated, the current state 14 is a travel state and a predicted future state 16 is a home state 10 (e.g., the user is predicted to be driving home), with other potential states 10 being a work state 10 (e.g., the user is driving to work) and a no-connectivity state 10 (e.g., the media-playback device 102 will lose its Internet connection). The predicted future state 16 may not be able to be predicted with certainty, so other states 10 may also be possible.

The media-playback device 102 plays back media content items to produce media output 110. In some embodiments, the media content items are provided by the media-delivery system 104 and transmitted to the media-playback device 102 using the network 106. A media content item is an item of media content, including audio, video, or other types of media content, which may be stored in any format suitable for storing media content. Non-limiting examples of media content items include songs, albums, audiobooks, music videos, movies, television episodes, podcasts, other types of audio or video content, and portions or combinations thereof.

The media-playback device 102 plays media content for the user. The media content that is played back may be selected based on user input or may be selected without user input. The media content may be selected for playback without user input by either the media-playback device 102 or the media-delivery system 104. For example, media content can be selected for playback without user input based on stored user profile information, location, particular states, current events, and other criteria. User profile information includes but is not limited to user preferences and historical information about the user's consumption of media content. User profile information can also include libraries and/or playlists of media content items associated with the user. User profile information can also include information about the user's relationships with other users (e.g., associations between users that are stored by the media-delivery system 104 or on a separate social media site). Where user data is used, it can be handled according to a defined user privacy policy and can be used to the extent allowed by the user. Where the data of other users is used, it can be handled in an anonymized matter so the user does not learn of the details of other users generally or specifically. Although the media-playback device 102 is shown as a separate device in FIG. 1, the media-playback device 102 can also be integrated with the vehicle V (e.g., as part of a dash-mounted vehicle infotainment system).

The media-playback engine 170 selects and plays back media content and generates interfaces for selecting and playing back media content items. In some examples, a user can interact with the media-playback engine 170 over a limited-attention user interface that requires less attention from the user and/or is less distracting than a standard interface. This limited-attention interface can be useful during travel states because a user may have limited attention available for interacting with a media-playback device due to the need to concentrate on travel related activities, including for example driving and navigating. But the limited-attention interface can also be configured for use playing back media content during states 10 that require the user's concentration (e.g., exercising, playing games, operating heavy equipment, reading, studying, etc.). The media-playback engine can include a limited-attention media-playback engine that generates interfaces for selecting and playing back media content items. In at least some embodiments, the limited-attention media-playback engine generates interfaces that are configured to be less distracting to a user and require less attention from the user than a standard interface.

The prediction engine 107 can make predictions regarding states 10. For example, the prediction engine 107 can predict one or more current states 14 for the user, system 100, and/or media-playback device 102. The prediction engine 107 can also make predictions regarding one or more predicted future states 16. The future states 16 can be states that the device will enter after the current state 14 or will enter within a threshold amount of time (e.g., within 30 minutes, 1 hour, 12 hours, 24 hours). The caching engine 108 curates a cache of the media-playback device 102. For example, the caching engine 108 can modify or delete cached data. The caching engine 108 can also fetch or receive data to be placed in the cache. The caching engine can retrieve and check the status of cached data (e.g., for playback). The caching engine can perform these or other cache operations periodically, related to the occurrence of an event, upon request (e.g., by the user or a software process), or at another time. The prediction engine 107 and the caching engine 108 can cooperate to provide an improved user experience as the user transitions from state to state.

Figure 2:
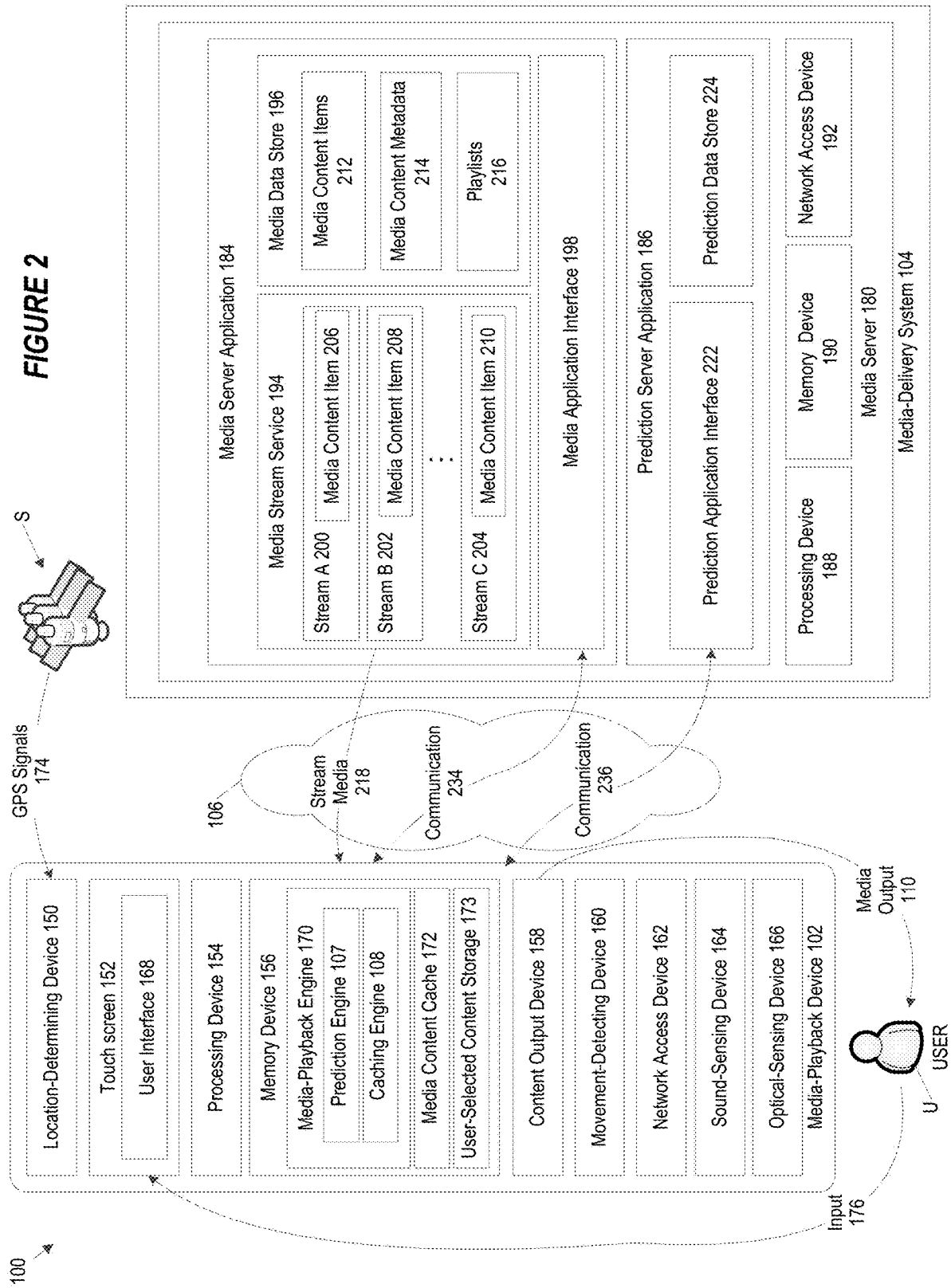
FIG. 2 is a schematic illustration of the example system of FIG. 1.

FIG. 2 is a schematic illustration of another example of the system 100 for media content caching and state prediction. In FIG. 2, the media-playback device 102, the media-delivery system 104, and the network 106 are shown. Also shown are the user U and satellites S.

As noted above, the media-playback device 102 plays media content items. In some embodiments, the media-playback device 102 plays media content items that are provided (e.g., streamed, transmitted, etc.) by a system external to the media-playback device such as the media-delivery system 104, another system, or a peer device. Alternatively, in some embodiments, the media-playback device 102 plays media content items stored locally on the media-playback device 102. Further, in at least some embodiments, the media-playback device 102 plays media content items that are stored locally as well as media content items provided by other systems.

In some embodiments, the media-playback device 102 is a computing device, handheld entertainment device, smartphone, tablet, watch, wearable device, or any other type of device capable of playing media content. In yet other embodiments, the media-playback device 102 is an in-dash vehicle computer, laptop computer, desktop computer, television, gaming console, set-top box, network appliance, Blu-ray® disc or DVD player, media player, stereo system, smart speaker, Internet-of-things device, or radio.

In at least some embodiments, the media-playback device 102 includes a location-determining device 150, a touch screen 152, a processing device 154, a memory device 156, a content output device 158, a movement-detecting device 160, a network access device 162, a sound-sensing device 164, and an optical-sensing device 166. Other embodiments may include additional, different, or fewer components. For example, some embodiments do not include one or more of the location-determining device 150, the touch screen 152, the sound-sensing device 164, and the optical-sensing device 166.

The location-determining device 150 is a device that determines the location of the media-playback device 102. In some embodiments, the location-determining device 150 uses one or more of the following technologies: Global Positioning System (GPS) technology which may receive GPS signals 174 from satellites S, cellular triangulation technology, network-based location identification technology, Wi-Fi® positioning systems technology, and combinations thereof.

The touch screen 152 operates to receive an input 176 from a selector (e.g., a finger, stylus, etc.) controlled by the user U. In some embodiments, the touch screen 152 operates as both a display device and a user input device. In some embodiments, the touch screen 152 detects inputs based on one or both of touches and near-touches. In some embodiments, the touch screen 152 displays a user interface 168 for interacting with the media-playback device 102. As noted above, some embodiments do not include a touch screen 152. Some embodiments include a display device and one or more separate user interface devices. Further, some embodiments do not include a display device.

In some embodiments, the processing device 154 comprises one or more central processing units (CPU). In other embodiments, the processing device 154 additionally or alternatively includes one or more digital signal processors, field-programmable gate arrays, or other electronic circuits.

The memory device 156 operates to store data and instructions. In some embodiments, the memory device 156 stores instructions for a media-playback engine 170 that includes the prediction engine 107 and the caching engine 108.

Some embodiments of the memory device 156 also include a media content cache 172. The media content cache 172 stores media-content items, such as media content items that have been previously received from the media-delivery system 104. The media content items stored in the media content cache 172 may be stored in an encrypted or unencrypted format. The media content cache 172 can also store decryption keys for some or all of the media content items that are stored in an encrypted format. The media content cache 172 can also store metadata about media-content items such as title, artist name, album name, length, genre, mood, or era. The media content cache 172 can also store playback information about the media content items, such as the number of times the user has requested to playback the media content item or the current location of playback (e.g., when the media content item is an audiobook, podcast, or the like for which a user may wish to resume playback). Media content items stored in the content cache 172 may be stored in a manner that makes the cached media content items inaccessible or not readily accessible to a user. For example, the cached media content items can be stored in a sandboxed memory space for the media-playback engine 170 (e.g., space in memory generally private to the media-playback engine 170). In another example, the cached media content items may be stored in a format understandable by the media-playback engine 170, but is obfuscated or not readily understandable by the user or other programs. For example, the cached media content items may be encrypted, and the media-playback engine 170 can cause the media content items to be decrypted, but a user is not readily able to cause the media content items to be decrypted (e.g., the user lacks a decryption key). In another example, the cached media content items may be stored in a format such that the user would need to convert the cached media content items to a different format before playing the media content item using something other than the media-playback engine 170. For instance, the cached media content items may be stored in a proprietary format playable by the media-playback engine 170, but the user would need to convert the file into a different format to play the media content items. In another example, one or more file attributes associated with the media content cache 172 can be set to permit access by the media-playback engine 170 but prevent access by others.

Some embodiments of the memory device 156 also include user-selected content storage 173. The user-selected content storage 173 stores media-content items selected by the user for storage at the media-playback device. The media-playback device 102 may support receiving media content items from another user device for storage in the user-selected content storage 173. For example, the user may connect the media-playback device 102 to a computer and transfer media content items from the computer to the user-selected content storage 173 for later playback. The media-playback device 102 may also support downloading media content items from the media-delivery system 104 to the media-playback device 102 for storage in the user-selected content storage 173. For example, the user may download media content items from a cloud-based content library for local storage and playback. The media-playback device 102 may also use the user-selected content storage 173 to store content that the user generated with the media-playback device 102. For example, the user may record video or mix a song using the media-playback device 102 and have the content stored in the user-selected content storage 173. In some examples, in contrast to the content cache 172, some or all of the media content items stored in the user-selected content storage 173 may, but need not, be readily accessible to the user. For example, the media content items in the user-selected content storage 173 may be stored in a location readily accessible to the user using a file manager (e.g., the user-selected content storage 173 is not in a private or sandboxed memory space).

While cached media content items and user-selected media content items may be stored separately in a respective media content cache 172 and user-selected content storage 173, they need not be. Instead, the items may be stored together, but flagged or otherwise distinguished.

The memory device 156 typically includes at least some form of computer-readable media. Computer readable media includes any available media that can be accessed by the media-playback device 102. By way of example, computer-readable media include computer readable storage media and computer readable communication media.

Computer readable storage media includes volatile and nonvolatile, removable and non-removable media implemented in any device configured to store information such as computer readable instructions, data structures, program modules, or other data. Computer readable storage media includes, but is not limited to, random access memory, read only memory, electrically erasable programmable read only memory, flash memory and other memory technology, compact disc read only memory, Blu-ray® discs, digital versatile discs or other optical storage, magnetic cassettes, magnetic tape, magnetic disk storage or other magnetic storage devices, or any other medium that can be used to store the desired information and that can be accessed by the media-playback device 102. In some embodiments, computer readable storage media is non-transitory computer readable storage media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The content output device 158 operates to output media content. In some embodiments, the content output device 158 generates media output 110 for the user U. Examples of the content output device 158 include a speaker assembly comprising one or more speakers, an audio output jack, a Bluetooth® transmitter, a display panel, and a video output jack. Other embodiments are possible as well. For example, the content output device 158 may transmit a signal through the audio output jack or Bluetooth® transmitter that can be used to reproduce an audio signal by a connected or paired device such as headphones, speaker system, or vehicle head unit.

The movement-detecting device 160 senses movement of the media-playback device 102. In some embodiments, the movement-detecting device 160 also determines an orientation of the media-playback device 102. In at least some embodiments, the movement-detecting device 160 includes one or more accelerometers or other motion-detecting technologies or orientation-detecting technologies. As an example, the movement-detecting device 160 may determine an orientation of the media-playback device 102 with respect to a primary direction of gravitational acceleration. The movement-detecting device 160 may detect changes in the determined orientation and interpret those changes as indicating movement of the media-playback device 102. The movement-detecting device 160 may also detect other types of acceleration of the media-playback device and interpret that acceleration as indicating movement of the media-playback device 102 too.

The network access device 162 operates to communicate with other computing devices over one or more networks, such as the network 106. Examples of the network access device include one or more wired network interfaces and wireless network interfaces. Examples of wireless network interfaces include infrared, Bluetooth® wireless technology, 802.11 a/b/g/n/ac, and cellular or other radio frequency interfaces.

The network 106 is an electronic communication network that facilitates communication between the media-playback device 102 and the media-delivery system 104. An electronic communication network includes a set of computing devices and links between the computing devices. The computing devices in the network use the links to enable communication among the computing devices in the network. The network 106 can include routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various embodiments, the network 106 includes various types of links. For example, the network 106 can include wired and/or wireless links, including Bluetooth®, ultra-wideband (UWB), 802.11, ZigBee®, cellular, and other types of wireless links. Furthermore, in various embodiments, the network 106 is implemented at various scales. For example, the network 106 can be implemented as one or more vehicle are networks, local area networks (LANs), metropolitan area networks, subnets, wide area networks (such as the Internet), or can be implemented at another scale. Further, in some embodiments, the network 106 includes multiple networks, which may be of the same type or of multiple different types.

The sound-sensing device 164 senses sounds proximate the media-playback device 102 (e.g., sounds within a vehicle in which the media-playback device 102 is located). In some embodiments, the sound-sensing device 164 comprises one or more microphones. For example, the sound-sensing device 164 may capture a recording of sounds from proximate the media-playback device 102. These recordings may be analyzed by the media-playback device 102 using speech-recognition technology to identify words spoken by the user. The words may be recognized as commands from the user that alter the behavior of the media-playback device 102 and the playback of media content by the media-playback device 102. The words and/or recordings may also be analyzed by the media-playback device 102 using natural language processing and/or intent-recognition technology to determine appropriate actions to take based on the spoken words. Additionally or alternatively, the sound-sensing device may determine various sound properties about the sounds proximate the user such as volume, dominant frequency or frequencies, etc. These sound properties may be used to make inferences about the environment proximate to the media-playback device 102 such as whether the sensed sounds are likely to correspond to a private vehicle, public transportation, etc. In some embodiments, recordings captured by the sound-sensing device 164 are transmitted to media-delivery system 104 (or another external server) for analysis using speech-recognition and/or intent-recognition technologies.

The optical-sensing device 166 senses optical signals proximate the media-playback device 102. In some embodiments, the optical-sensing device 166 comprises one or more light sensors or cameras. For example, the optical-sensing device 166 may capture images or videos. The captured images can be processed (by the media-playback device 102 or an external server such as the media-delivery system 104 to which the images are transmitted) to detect gestures, which may then be interpreted as commands to change the playback of media content. Similarly, a light sensor can be used to determine various properties of the environment proximate the user computing device, such as the brightness and primary frequency (or color or warmth) of the light in the environment proximate the media-playback device 102. These properties of the sensed light may then be used to infer whether the media-playback device 102 is in an indoor environment, an outdoor environment, a private vehicle, public transit, etc.

The media-delivery system 104 comprises one or more computing devices and provides media content items to the media-playback device 102 and, in some embodiments, other media-playback devices as well. The media-delivery system 104 includes a media server 180. Although FIG. 2 shows a single media server 180, some embodiments include multiple media servers. In these embodiments, each of the multiple media servers may be identical or similar and may provide similar functionality (e.g., to provide greater capacity and redundancy, or to provide services from multiple geographic locations). Alternatively, in these embodiments, some of the multiple media servers may perform specialized functions to provide specialized services (e.g., services to enhance media content playback during travel or other activities, etc.). Various combinations thereof are possible as well.

The media server 180 transmits stream media 218 to media-playback devices such as the media-playback device 102. In some embodiments, the media server 180 includes a media server application 184, a prediction server application 186, a processing device 188, a memory device 190, and a network access device 192. The processing device 188, memory device 190, and network access device 192 may be similar to the processing device 154, memory device 156, and network access device 162 respectively, which have each been previously described.

In some embodiments, the media server application 184 streams music or other audio, video, or other forms of media content. The media server application 184 includes a media stream service 194, a media data store 196, and a media application interface 198. The media stream service 194 operates to buffer media content such as media content items 206, 208, and 210, for streaming to one or more streams 200, 202, and 204.

The media application interface 198 can receive requests or other communication from media-playback devices or other systems, to retrieve media content items from the media server 180. For example, in FIG. 2, the media application interface 198 receives communication 234 from the media-playback engine 170.

In some embodiments, the media data store 196 stores media content items 212, media content metadata 214, and playlists 216. The media data store 196 may comprise one or more databases and file systems. As noted above, the media content items 212 may be audio, video, or any other type of media content, which may be stored in any format for storing media content.

The media content metadata 214 operates to provide various information associated with the media content items 212. In some embodiments, the media content metadata 214 includes one or more of title, artist name, album name, length, genre, mood, era, and other information. The playlists 216 operate to identify one or more of the media content items 212 and. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era. The playlists 216 may include user-created playlists, which may be available to a particular user, a group of users, or to the public.

The prediction server application 186 provides prediction-specific functionality for providing media content items and interfaces for accessing media content items to media-playback devices. In some embodiments, the prediction server application 186 includes a prediction application interface 222 and a prediction data store 224.

The prediction application interface 222 can receive requests or other communication from media-playback devices or other systems, to retrieve prediction information and media content items for playback during predicted states. For example, in FIG. 2, the prediction application interface 222 receives communication 236 from the media-playback engine 170.

The prediction application interface 222 can also generate interfaces that are transmitted to the media-playback device 102 for use by the prediction engine 107 and/or the caching engine 108. In some embodiments, the prediction application interface 222 generates predictions of current states 14 or future states 16.

Additionally, the prediction server application 186 can process data and user input information received from the media-playback device 102. In some embodiments, prediction server application 186 operates to transmit information about a prediction of one or more states 10, as well as the suitability of one or more media content items for playback during states. In some embodiments, the prediction server application 186 may provide a list of media content items that are suited to particular states, and the prediction server application 186 may cooperate with the caching engine 108 to curate the media content cache 172 based on media content items suited to particular states or other criteria.

For example, the prediction server application 186 may store metadata and other information that associates media content items with states 10 in the prediction data store 224. The prediction server application 186 may also store information that associates media content items with an individual or group of users' preferences for consuming that media content during particular states in the prediction data store 224. The prediction data store 224 may also store information that associates particular behavior with certain predicted current or future states based on actions of the current user or groups of other users. The prediction data store 224 may comprise one or more files or databases. The prediction data store 224 can also comprise files, tables, or fields in the media data store 196.

In some embodiments, the prediction data store 224 stores prediction media metadata. The prediction media metadata may include various types of information associated with media content items, such as the media content items 212. In some embodiments, the prediction data store 224 provides information that may be useful for selecting media content items for playback during particular states. For example, in some embodiments, the prediction data store 224 stores state scores for media content items that correspond to the suitability of particular media content items for playback during particular states. As another example, in some embodiments, the prediction data store 224 stores timestamps (e.g., start and end points) that identify portions of media content items that are particularly well-suited for playback during particular states.

Each of the media-playback device 102 and the media-delivery system 104 can include additional physical computer or hardware resources. In at least some embodiments, the media-playback device 102 communicates with the media-delivery system 104 via the network 106.

Although in FIG. 2 only a single media-playback device 102 and media-delivery system 104 are shown, in accordance with some embodiments, the media-delivery system 104 can support the simultaneous use of multiple media-playback devices, and the media-playback device can simultaneously access media content from multiple media-delivery systems. Additionally, although FIG. 2 illustrates a streaming media based system for media-playback, other embodiments are possible as well. For example, in some embodiments, the media-playback device 102 includes a media data store 196 (e.g., the user-selected content storage 173 can act as a media data store 196) and the media-playback device 102 is configured to select and playback media content items without accessing the media-delivery system 104. Further in some embodiments, the media-playback device 102 operates to store previously-streamed media content items in a local media data store (e.g., in the media content cache 172).

In at least some embodiments, the media-delivery system 104 can be used to stream, progressively download, or otherwise communicate music, other audio, video, or other forms of media content items to the media-playback device 102 for playback during travel on the media-playback device 102. In accordance with an embodiment, a user U can direct the input 176 to the user interface 168 to issue requests, for example, to select media content for playback during travel on the media-playback device 102.

Figure 3:
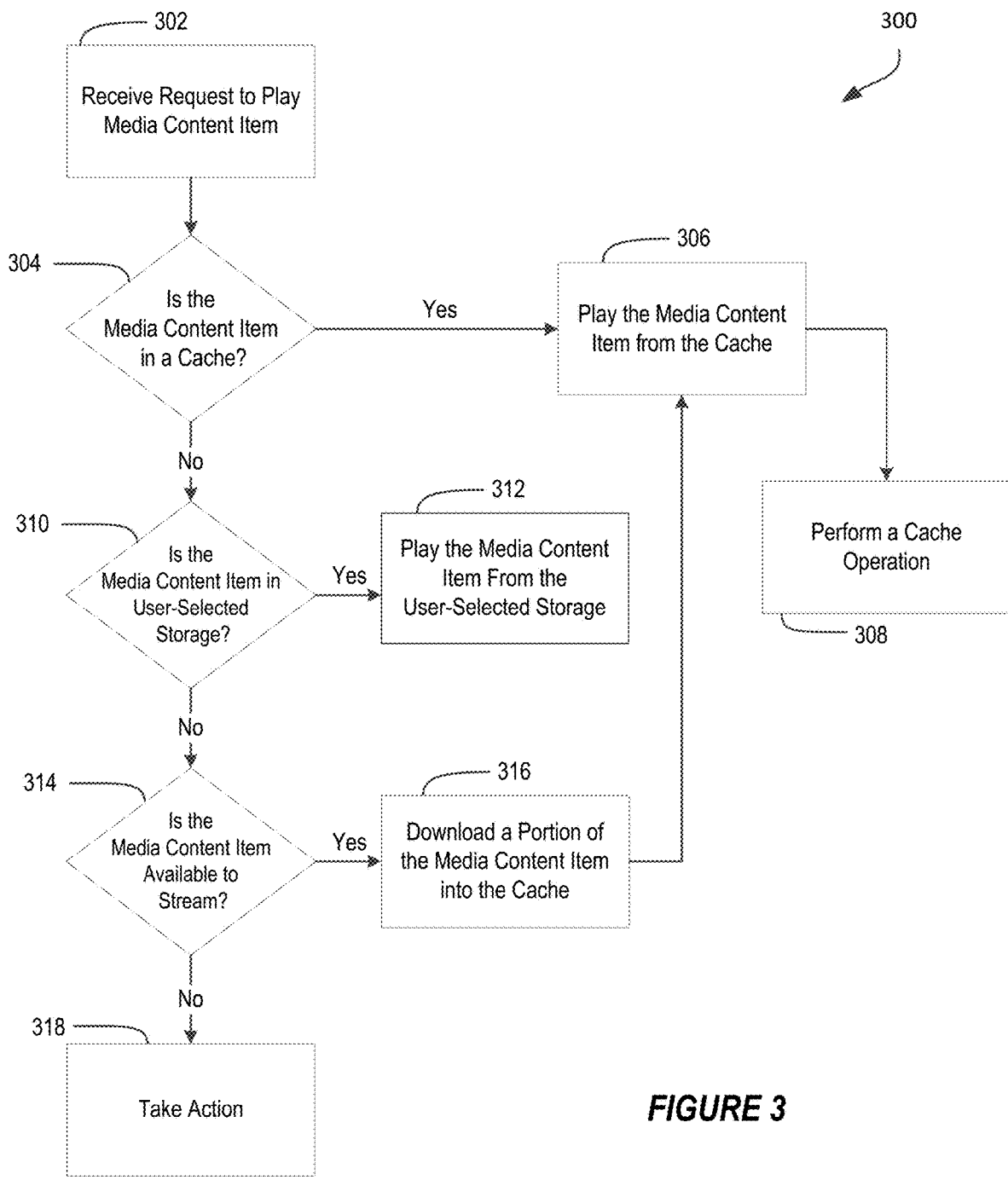
FIG. 3 is a block diagram illustrating an example process for playing media content items responsive to a user request.

FIG. 3 illustrates an example process 300 for playing media content items responsive to a user request. The media-playback engine 170 may use this process 300 to respond to a user's request to playback a media content item.

The process can begin with operation 302, which relates to receiving a request to play a media content item. In an example, the media-playback device may receive a request from a user to play a media content item. The media-playback device 102 may have a touch screen 152 displaying a user interface 168 and the user may make a selection on the user interface 168 to request playback of a media content item. The user may use a voice command to instruct the media-playback device 102 to play a media content item. In another example, the request need not come directly from a user. For instance, an application running on the media-playback device may request that a media content item be played (e.g., an alarm clock app may request a song be played). As another example, the media-playback engine may be playing a playlist of media content items and the request may be a request to play a next media content item in a playlist because the previous media content item has finished playing. Operation 302 can be followed by operation 304.

Operation 304 is a decision operation that relates to determining whether the media content item is in a cache. The media-playback device 102 can check whether the requested media content item is in the media content cache 172. This can be performed by, for example, using the caching engine 108 or another resource. If the media content item is located in the media content cache 172, the flow can move to operation 306. If the media content item is not located in the cache, the flow can move to operation 310.

Operation 306 relates to playing a media content item from the cache. The media-playback device can play the requested media content item from the cache. The media content item can be a whole media content item (e.g., a previously-cached media content item) or a partial media content item (e.g., a currently-streaming media content item). Operation 306 may be followed by operation 308.

Operation 308 relates to performing a cache operation. The caching engine 108 can perform an operation on the media content cache 172 according to caching preferences. For example, the caching engine 108 can remove the played media content item from the cache. The caching engine 108 may select a next media content item to cache. For example, if the played media content item is a first song in an album, the cache operation may fetch and cache the next song in the album.

Operation 310 is a decision operation that relates to determining whether the media content item is in user-storage. If it was determined in operation 304 that the media content item is not in a cache, the media-playback engine 170 can then determine whether the media content item is stored in user-selected content storage 173. If the media content item is stored in user-selected content storage 173, then the flow can move to operation 312. If the media content item is not stored in user-selected content storage 173, then the flow can move to operation 314.

Operation 312 relates to playing a media content item from user-selected storage. The media-playback device can play the requested media content item from the user-selected storage.

Operation 314 is a decision operation that relates to determining whether the media content item is available to stream. This can include querying the media-delivery system 104 to determine whether the media content item is available to stream. If the media content item is available for streaming, the flow may move to operation 316. If the media content item is unavailable for streaming, the flow may move to operation 318.

Operation 316 relates to downloading a portion of the media content item into the cache. This operation can include sending a request to the media-delivery system 104 to stream the media content item. The media server 180 may then transmit stream media 218 to the media-playback device 102, which may buffer, store, cache, or otherwise place at least a portion of the media content item into the media content cache 172 for playback. Following operation 316, the flow may move to operation 306 for playback of the media content item.

Operation 318 relates to taking an action responsive to determining that the media content item is neither in the media content cache 172 nor in the user-selected content storage 173, nor available to stream. The action can be proving notice to the user that the media content item is unavailable. The action can also be attempting to play a next media content item.

Figure 4:
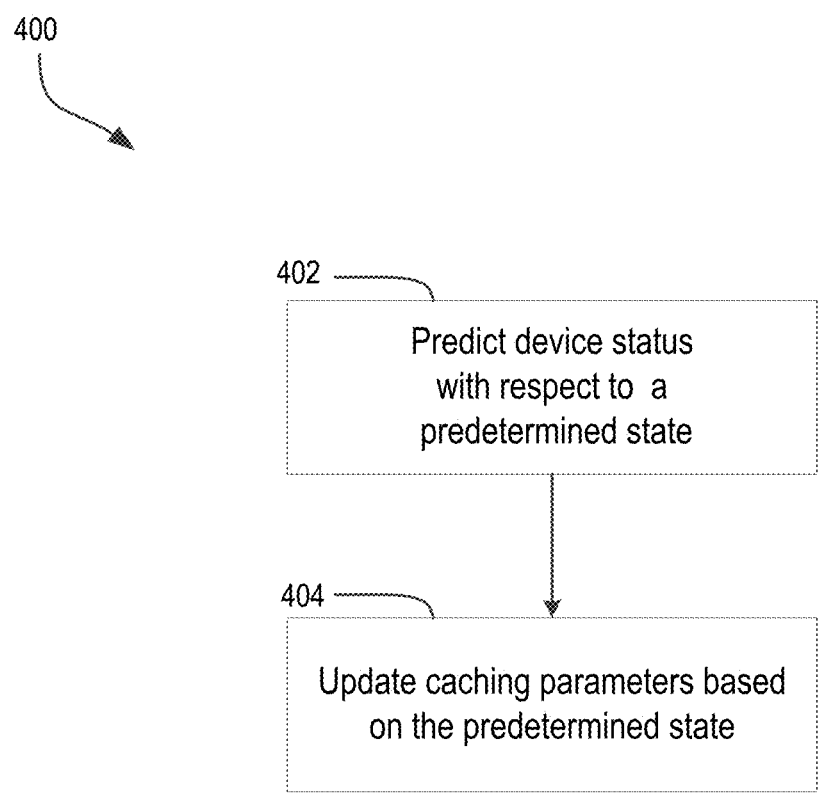
FIG. 4 is a block diagram illustrating an example process for updating caching parameters based on predicting a device status with respect to a predetermined state.

FIG. 4 is a block diagram illustrating an example process 400 for updating caching parameters based on predicting a device status with respect to a predetermined state. As previously described, predicting states 10, including a current state 14 and a future state 16 can be relevant to improving user experience with a media-playback device. For example, by determining a next, predicted state 16 and updating caching parameters based on the state. In this manner, the media-playback device may be able to play media content items from the cache rather than needing to stream the media content item from a media-delivery system 104, which can cause challenges.

Process 400 may begin with operation 402, which relates to predicting a device status with respect to a predetermined state. This can involve predicting one or more current states 14 of the system 100, the media-playback device 102 and/or the user. It can also involve predicting one or more next, future states 16 of the media-playback device 102. This can also involve determining metadata regarding the state, which can include a confidence value for the prediction (e.g., confidence that the predicted current state accurately reflects the actual current state), as well as predictions regarding attributes, preferences, and other data regarding the user and/or the media-playback device 102. For example, the data may include a predicted Internet connection speed of the media-playback device in that state, what kinds of media content items the user will be interested in playing in that state, and other data. After operation 402, the flow may move to operation 404.

Operation 404 relates to updating caching parameters. The caching engine 108 may curate the media content cache 172 according to caching parameters. These parameters can be updated by the user or the media-playback device (e.g., an operating system of the media-playback device 102). These parameters can also be updated by media-playback engine 170, the prediction engine 107, and/or the caching engine 108 itself responsive to predicted current state 14 or a predicted future state 16. In another example, one or more of the caching parameters can be chosen by the user. For example, the user may set a maximum amount of local storage to allocated for cached items. In another example, the user can specify particular settings for particular states. The caching engine 108 can then operate according to the updated parameters during its next cache operation.

Figure 5:
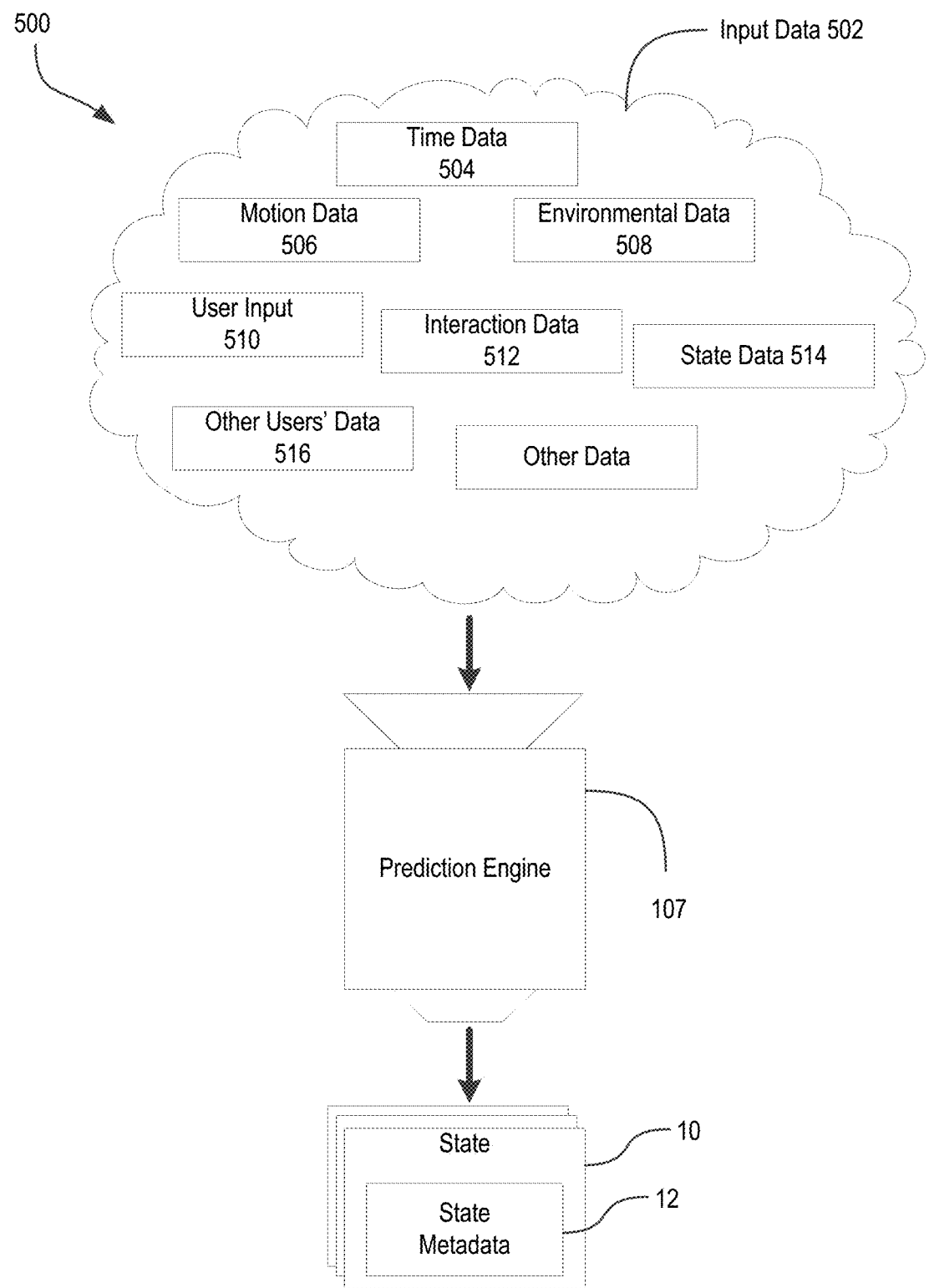
FIG. 5 is a block diagram illustrating an example process for predicting states.

FIG. 5 is a block diagram illustrating an example process 500 for predicting states 10. The process 500 can begin with receiving one or more items of input data 502 that can be used to predict a current or future state. The input data 502 can include but need not be limited to time data 504, motion data 506, environmental data 508, user input 510, interaction data 512, state data 514, and other users' data 516.

The time data 504 can include temporal information associated with the user or the media-playback device 102. Examples of time data 504 can include the current time of day, a duration that a user has been in a particular state, a media-playback device 102 power-on time, a time until a battery is charged or depleted, a time left in a work day, a screen-on time, a time until a particular event, alarm clock setting, or other time information. For example, a time until a battery of the media-playback device 102 is depleted being less than a time until a next predicted state can indicate that the next state may be a low-battery rather than the previously-predicted state.

Motion data 506 can include information associated with motion of the user or the media-playback device 102. Examples of the motion data 506 can include orientation, movement, acceleration, speed, attitude, rotation rates, vibration, data from the movement-detecting device 160, and other motion-related measurements of the media-playback device 102. For example, one or more of the motion data 506 can be used to determine that the media-playback device moves and stops repeatedly, which can suggest that the media-playback device 102 is placed in a bus stopping at bus stops. This can indicate to the prediction engine 107 that the device is in a particular state (e.g., travel state, commuting state, bus travel state, etc.).

The environmental data 508 can include factors or information associated with the surroundings of the user or the media-playback device 102. Examples of the environmental data 508 include a current location, elevation, weather information, temperature, humidity, pressure, and any other information of the surroundings, such as ambient noise and light data. The environmental data 508 can include data from the network access device 162, data from the sound-sensing device 164, data from the optical-sensing device 166, data received from the media-delivery system 104. The environmental data 508 can also include nearby detected networks and devices. For example, environmental data 508 may include data indicating that the media-playback device 102 is in or passes through one or more different wireless networks (e.g., Wi-Fi® networks or cell towers), which can suggest that the media-playback device 102 is in a particular location or traveling in a particular direction.

The user input 510 includes historic or contemporaneous data received from the user. User input 510 can include answers received from a user, such as answers regarding predetermined states. For example, the user can be prompted to specify his or her current state, which can then allow the prediction engine 107 to determine that the user is in the specified state. As another example, the user can be prompted to provide scheduling information, such as when the user typically is commuting, at work, or at home. As another example, the user can be asked whether a prediction is correct. For example, the prediction engine 107 may predict that the user is in a given current state 14 or will soon enter a future state 16. The user can be asked whether those predictions are correct, and the user's answers can be used to inform future predictions.

The interaction data 512 can include factors or information associated with user interaction with the media-playback device 102. Examples of the user interaction factors include information about a history or pattern of using a particular software program, such as a navigation application (e.g., Google® Maps, Microsoft® Bing™ Maps, or Apple® Maps), an online transportation network application (e.g., Uber®, Lyft®, Hailo®, or Sidecar), and a public transit application; a time history or pattern of launching the software program; a period of time (duration) during which the software program is used; information on whether there has been no user input lacks for a predetermined period of time; a history or pattern of searching, browsing, or playing back media content items or playlists thereof, a history of a user's social network activity; information about a user's calendar; and any other information involving user interaction with the media-playback device 102. By way of example, when it is detected that a navigation application is launched and used, the media-playback device 102 may be considered to be in a travel state.

The state data 514 can include data relating to historic, current, or future state data. State data 514 can include previous states 10 in which the user has been, the current state 14, metadata 12 regarding those states, and include input data 502 received before, during, or after those states 10. For example, historic state data may indicate that, during a typical work day, a pattern of user states includes a home state, a travel state, a work state, a travel state, and a home state. Based on that historic state data pattern, the prediction engine 107 may predict that a user will enter a travel state next, if the user has already been in a home state, a travel state, and a work state that day.

The other users' data 516 can include data associated with users other than the user for which the state prediction is being made. The other users' data 516 can include can include current, past, or future states of other users; metadata 12 regarding those states 10; and include input data 502 received before, during, or after those states 10. For example, if a user's current input data 502 is similar to the input data 502 of other users before they entered a travel state, the prediction engine 107 may also predict that the user will enter a travel state as well.

The input data 502 can then be used as input to the prediction engine 107. The prediction engine 107 can then use the input data 502 to produce one or more predictions with respect to a current state 14 or future state 16 of the device, as well as metadata 12 regarding the state 10.

The prediction engine 107 can operate in a variety of ways. In an example, the prediction engine 107 may compare one or more of the input data 502 against a variety of criteria to arrive at one or more predicted states 10. For example, the prediction engine 107 can have a user-at-home criteria, which can be met if the user is located at home. This can involve comparing a user's current location to a predicted or known location of the user's home to determine. A user that is within a threshold distance of the home location may be considered to be located at home and may meet that criteria. Meeting criteria can add a weight to a particular prediction (e.g., meeting the user-at-home criteria can add weight to the user being in a home state). Criteria can be built on other criteria.

Figure 7:
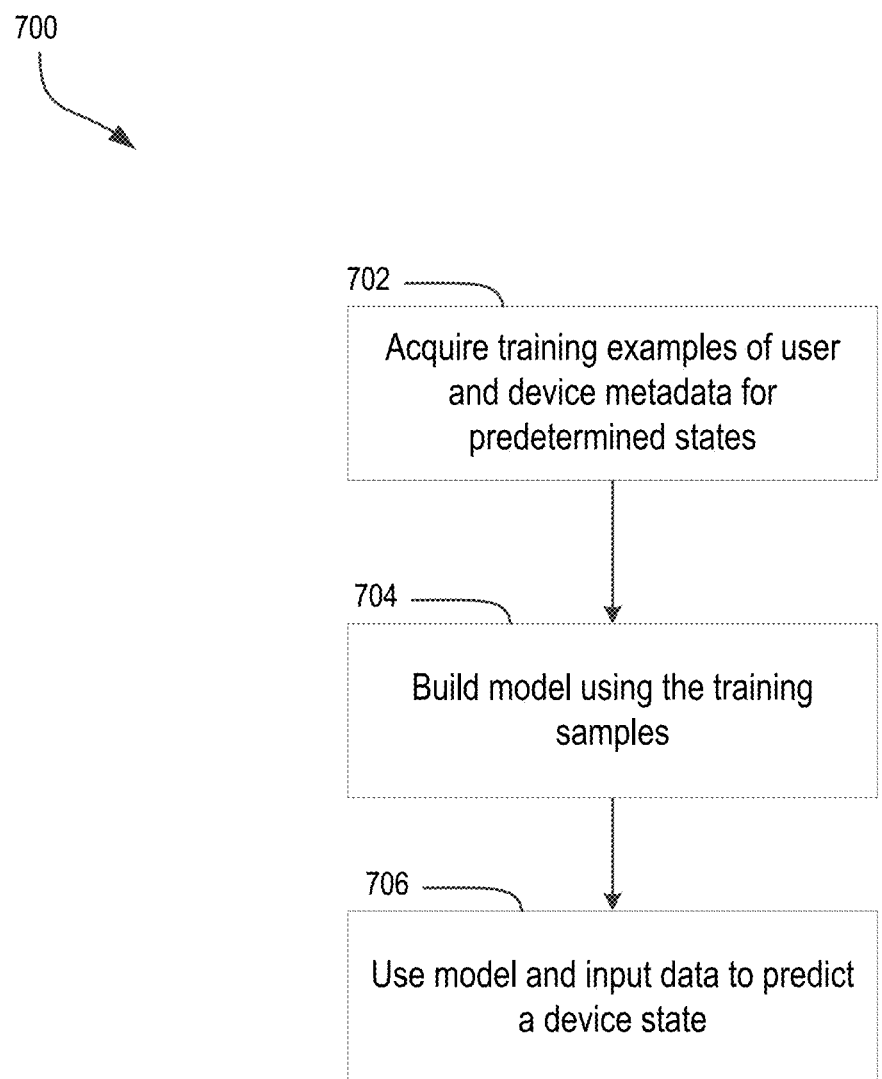
FIG. 7 is a block diagram illustrating an example process for predicting a state.

In another example, the prediction engine 107 can utilize one or more machine learning algorithms to arrive at a prediction (see, e.g., FIG. 7). In an example, predictions can be based on heuristics. Various states can be scored based on the input data 502. For example, input data 502 indicating that the user is moving can add ten points to a score for a travel state and subtract ten points from a score indicating that the user is in a home state. In an example, a predicted current state 14 or future state 16 can be a state surpassing a threshold score or a state having a highest score.

In an example, the prediction engine 107 may have a list of pre-generated states (e.g., home, work, travel, etc.), assign a likelihood value to each state based on the input data 502 (e.g., a likelihood that the respective state is the current or future state), and then produce a result set of the states and their likelihood. These pre-generated states may have respective, default metadata. The default metadata may be based on observations of the current user, other users, other data, or combinations thereof. In another example, the prediction engine 107 may make predictions regarding specific metadata and then package them together into a state or select a state based on the predicted metadata.

Figure 6:
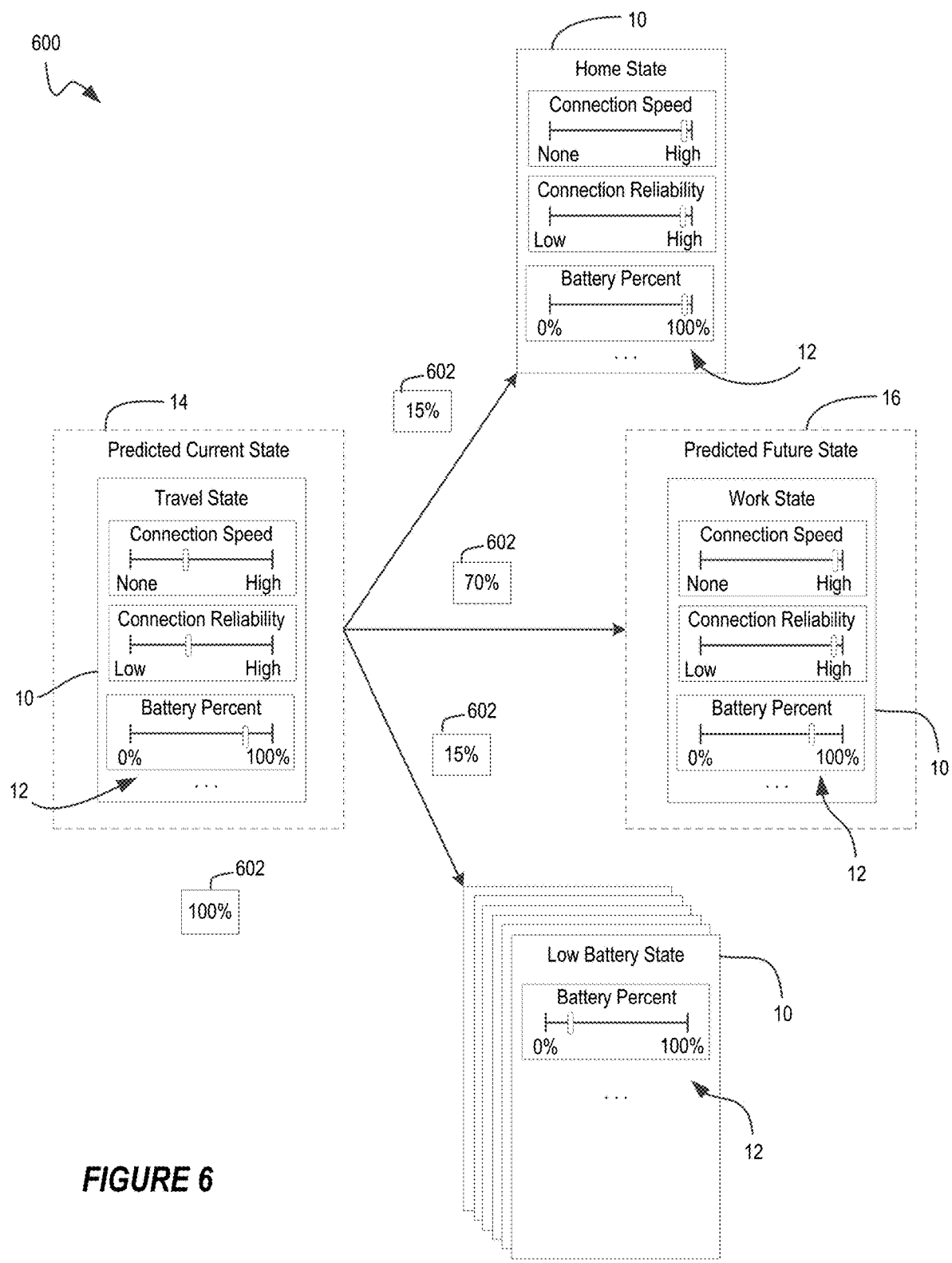
FIG. 6 is a block diagram illustrating an example prediction of FIG. 5.

FIG. 6 is a block diagram illustrating an example of a prediction 600 performed by the prediction engine 107 shown in FIG. 5. As illustrated, there is a single predicted current state 14 leading to a single selected predicted future state 16, as well as multiple potential other future states. For each state 10, the prediction engine 107 can assign a confidence level 602 or probability to each state. In the illustrated example, there is a 100% confidence level 602 that the current state is a travel state, a 15% confidence level 602 that the next, future state will be the home state 10, a 70% confidence level 602 that the next, future state will be a work state 10, and a 15% confidence level 602 that the next state will be a different state, such as a low battery state. Based on these confidence levels 602, the prediction engine 107 indicated that the predicted current state 14 is a travel state 10 and that the predicted future state 16 is a work state 10.

As illustrated, the predicted current state 14 is a travel state 10. "Travel" and variants thereof refers to any activity in which a user is in transit between two locations. For example, a user is in transit when being conveyed by a vehicle, including motorized and non-motorized, public transit and private vehicles. A user is also in transit when moving between locations by other means such as walking and running.

The travel state 10 includes multiple items of metadata 12, including a predicted Internet connection speed, a predicted Internet connection reliability, and a predicted battery level. Other state metadata 12 can include predictions regarding an Internet connection cost, an Internet connection data cap amount, an Internet connection bandwidth, an Internet connection latency, a temperature of the media-playback device 102, an amount of storage free in the media-playback device 102, which media content items the user would be interested in playing, which media content items the user would not be interested in playing, a duration of the state, a location of the state, weather data of the state, an user activity in the state, media content items that other users play during that state, media content items that other users do not play during that state, data from previous times the user was in that state, a predicted mood of the user while in that state, a predicted energy level of the user while in that state, and other data. There can also be state-specific metadata. For example, a cooking state may include metadata regarding a kind of food being prepared. As another example, a travel state may include metadata regarding a travel destination, traffic along a travel route, a travel transportation type (e.g., public transit, personal vehicle, shared vehicle, etc.), travel transportation make, and a travel transportation model, among others.

Multiple states 10 can exist simultaneously and states can exist at multiple levels of specificity. For example, the user may be in a travel state 10 but can also have a strong Internet connection, so can be considered as being in a strong connection state. These can be considered as two different, simultaneously-current states 14, and can also be considered as a single, specific state (e.g., a traveling-with-a-strong-connection state). When there are multiple simultaneous states, they can all be considered a current state 14 or can be prioritized such that a highest-priority state 10 is considered the current state 14. For example, the states 10 can be prioritized in terms of how much they affect playback or overall user experience. For example, a low-battery state 10 may be considered as a higher priority than a travel state 10 because having a low battery can limit the amount of time that media content can be played and draining an already low battery can negatively affect a user experience.

FIG. 7 is a block diagram illustrating an example process 700 for predicting a state.

The process 700 can begin with operation 702, which relates to acquiring training examples of user and device metadata for states. In some embodiments, acquiring training examples includes acquiring files containing training examples. In some embodiments, acquiring training examples includes acquiring one or more lists of information that identifies a location of files containing the training examples (e.g., a location in the memory device 156 or the memory device 190). In an example, the training examples include states 10 and input data 502 that have positive or negative correlations with respective states. For example, the training example can include data that shows that a media-playback device traveling at speeds greater than 20 miles per hour (32 kilometers per hour) for longer than 1 minute strongly positively correlates with a travel state 10. As another example, the training example can include data that shows that a user having a calendar entry titled "running" positively correlates with an exercise state at that time. As another example, the training example can include data that shows that a user playing a media content item playlist called "cooking" is positively correlated with the user being in a cooking state. As another example, playing a "studying" playlist can positively correlate with a user being in a studying state. The training examples can be based on data gathered from the current user (e.g., based on a set of data, the prediction engine 107 previous predicted a particular future state 16 and that prediction ended up being correct or incorrect). The training examples can be based on data gathered from other users, such as other users sharing one or more demographic similarities with the user (e.g., location, age, music preferences, etc.). Training examples can also be based on data received directly from the user. For example, prediction engine 107 can ask the user questions, such an inquiry regarding the address of the user's workplace. The responses to those questions can be used as training data. For example, travel towards the workplace address can positively correlate with a current state being a travel state and a future state being a work state. Operation 704 can follow operation 702.

Operation 704 relates to building a model using the training samples. In various embodiments, the model is built using one or more machine learning techniques, such as through the use of neural networks. The model may, for example, operate to determine how similar or dissimilar given input data 502 is to particular training examples for particular states. Once generated, the models may be stored in memory device 156, memory device 190, or in another location, for later use to evaluate media content items. Operation 706 can follow operation 704.

Operation 706 relates to using the model and input data 502 to predict a device state. The input data 702 is run through the model to produce one or more predictions. The one or more predictions can have a respective score expressing a confidence in the prediction being correct, such as a value expressing how similar the input data 702 is to a particular training example. Such confidence can be expressed as, for example, a percent likelihood that the given state is the current state 14 or will be a future state 16.

One or more techniques for building models and training described in U.S. Patent Application No. 62/347,642, filed Jun. 9, 2016 and titled "Identifying Media Content", the disclosure of which is incorporated by reference herein in its entirety, can be similarly used by system 100 disclosed herein for building models for predicting device states.

Figure 8:
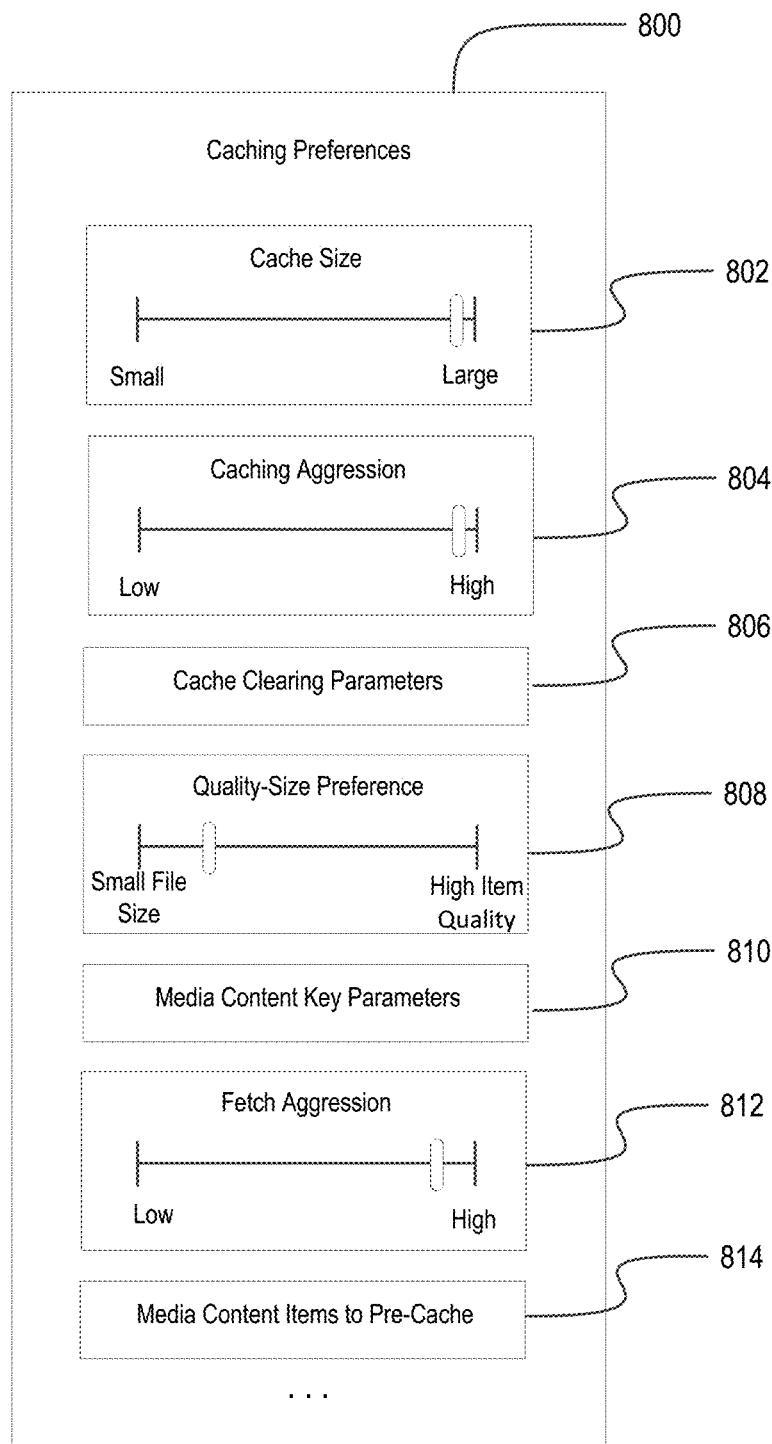
FIG. 8 is a block diagram illustrating example caching preferences.

FIG. 8 is a block diagram illustrating example caching preferences 800. The predicted states 10 can be used to inform modifications to one or more caching parameters. Caching parameters can include, but need not be limited to a caching aggression 804, cache clearing parameters 806, a quality-size preference 808, media content key parameters 810, a fetch aggression 812, media content items to pre-cache 814.

Cache size 802 reflects a size of the cache. Cache size 802 can include, but need not be limited to a number of media content items that can be stored in the cache at once, a total size of media content items that can be stored in the cache at once, and an amount of memory allocated for the cache.

Caching aggression 804 can reflect a tendency of the caching engine 108 to cache more content items rather than fewer. For example, after the media-playback engine 170 plays a media content item, the caching engine 108 may perform a cache operation and determine whether or not to keep the item in the cache. A more aggressive caching engine would tend to cache more media content items than a less aggressive caching engine.

Cache clearing parameters 806 can affect the circumstances under which a caching engine 108 will remove media content items from the cache. For example, the caching engine 108 can perform a cache operation to remove one or more media content items from the cache to make room for new media content items. The cache operation to remove media content items can occur periodically (e.g., once every hour) and/or can occur responsive to the caching engine 108 attempting to add a new content item to the cache. The caching engine 108 can use a variety of criteria to select media content items for removal, including but not limited to how long the media content item has been in the cache, a length of time since the media content item was last played, an amount of times the media content item has been played, a size of the media content item, and a quality of the media content item, and a prediction of when the user will play the media content item.

The quality-size preference 808 can reflect a preference between higher-quality cached items and smaller-sized cached items. A caching engine 108 having a preference towards higher-quality cached items may cache media in a higher-quality format (e.g., using a lossless codec or using a higher bit rate). Caching items at a higher-quality may result in the cached items having a larger file size compared to caching items at a lower quality.

Lower-quality items may have a smaller file size, which means that the items may be download from media-delivery system 104 for caching more quickly than larger, high-quality items. In some examples, the caching preferences 800 may cause the caching engine 108 to download media content items at a lower quality setting first and then replace the lower-quality media content items with higher quality media content items later. This can be beneficial in circumstances where the current or predicted state has limited network connectivity. This can also be beneficial in circumstances where the user may transition to a new state in a relatively short amount of time, and the quicker download speeds can mean that appropriate media content items are cached in time.

Media content key preferences can affect the caching of media content decryption keys. In some examples, the media content items are stored in the media content cache 172 in an encrypted format, and the media content cache 172 can store decryption keys for some or all of the media content items that are stored in an encrypted format. The media content key parameters 810 can affect how the caching engine 108 curates the storage of the media content keys in the cache, including but not limited to the length of time that the keys are stored, under what circumstances are the keys removed from the cache, and under what circumstances the keys are added to the cache. In some examples, when a media content item is added to the cache, so is an associated decryption key. After a period of time, the decryption key can be removed from the cache (e.g., for digital rights management purposes). The key can be retrieved (e.g., from the media-delivery system 104) the next time that the media content item is to be played. However, if the device 102 is in a state in which it cannot retrieve the key (e.g., the device is in an offline state), then the user may not be able to play the media content item, even though it is cached, because the key is not available to decrypt the content item. In an example, in anticipation of a limited network connectivity state, the media content key preferences 180 can be updated can include a preference to cause the caching engine 108 to retrieve all missing media content keys for cached media content items, and a preference to cause the caching engine to less aggressively delete media content keys.

Fetch aggression 812 can reflect how aggressively the caching engine 108 will cache media content items that it predicts may be played next or within a threshold period of time (e.g., as stored in a songs-to-pre-cache parameter). These media content items can be described as media content items to pre-cache 814. For example, if a user is currently playing the last song of an album, a caching engine with a moderate fetch aggression may cache the first song of the artist's next album. A caching engine with a high fetch aggression may download that song, as well as additional songs that may be played next, such as the first song of albums similar to the original album. An example process for selecting such items is described in FIG. 9.

The caching preferences 800 affect the caching of media content items and can also affect the caching of other data on the device, such as ancillary materials supporting the media content items. For example, for song media content items, there can also be associated lyrics, music videos, album art and other materials that are related to the media content items that can be cached. As another example, video media content items can include extra audio tracks, bonus content (e.g., deleted scenes, director's commentary, etc.) that can be cached. These ancillary materials can be affected by the same caching preferences as the media content items, separate preferences, or combinations thereof. For example, a high caching aggression 804 may cause an aggressive caching of the ancillary materials as well. In another example, the caching engine 108 can learn what ancillary materials the user (e.g., using the same or a similar process as described at FIG. 9) consumes and will aggressively download only those materials. For example, even with high caching aggression, the caching engine 108 may not download director's commentary for a movie if the user does not tend to view director's commentary.

Figure 9:
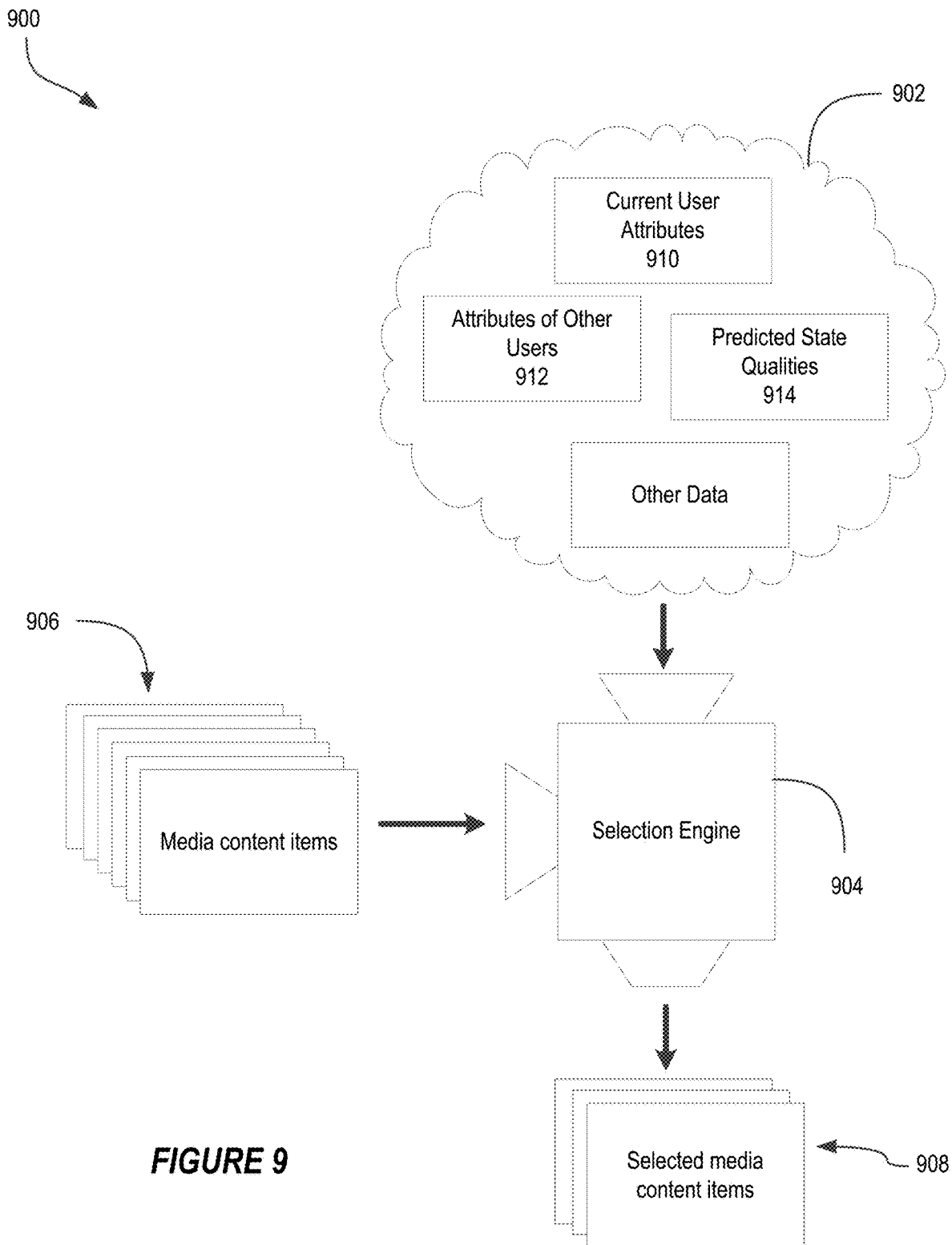
FIG. 9 is a block diagram illustrating an example process of selecting media content items.

FIG. 9 is a block diagram illustrating an example process 900 of selecting media content items, such as media content items to cache. The process 900 may begin with receiving input data 902 that may affect the selection of media content items. The input data 902 may be fed into a selection engine 904 that also receives a group of media content items available to be played (e.g., media content items available to the user on the media server 180). Based on the input data 902, the selection engine can output selected media content items 908. The selected media content items can reflect, for example, predicted media content items that the user may want to play in the current state or in the predicted future state.

The selection engine 904 can select media content items in a variety of ways. In an example, the user can specify media content items or kinds of media content items for selection for particular states. For example, the user can specify that he or she prefers to listen to electronic music in an exercise state and classical music in a cooking state. In an example, the selection engine can select top media content items for the user. For example top-rated content items (e.g., as rated by the user or others) or top-played content items (e.g., overall top played content items or top-played content items for particular states). In an example, the selection engine 904 can use data analysis and machine learning techniques to select media content items. In another example, the selection engine 904 can use heuristics and score various media content items based on their suitability based on the input data 902. For example, a media content item being played by the user before in the state can increase that media content item's score by x points, while a media content item being skipped by the use while in the state can decrease the media content item's score by y points. The selected media content items 908 can be media content items having a highest score or media content items having a score higher than a threshold.

The input data 902 can include, but need not be limited to: attributes of the current user 910, attributes of other users 912, predicted state qualities 914, and other data (e.g., data used to predict states as described with regard to FIG. 5).

Attributes of the current user 910 can be the qualities, characteristics, and preferences of the user that may affect the selection of media content items for the user. In this manner, attributes of the current user 910 can be used to select media content items that the user may enjoy in a predicted current or future state or in general.

The attributes 910 can include preferences for particular genres (e.g., where the media content items are music, the genres can include rock, country, rap, blues, jazz, classical, etc.), preferences for particular eras (e.g., 60s, 70s, 80s, etc.), preferences for particular media content items (e.g., specific songs, movies, albums, etc.), preferences for particular attributes of media content items (e.g., for songs the attributes can include: tempo, length, tone, instruments used, key, etc.), and other preferences. The attributes can also include user playback patterns (e.g., in which states the user plays particular kinds of media content items), most-played media content items, media content items marked as favorite media content items, liked media content items, disliked media content items, media playback items the user selected for download, media content items in the user's library, playlists of the user, and other playback patterns. The attributes 910 can also include demographic information regarding the user, including but not limited to the user's age, gender, location, mood, activity level, and other demographic information.

Attributes of other users 912 can include the qualities, characteristics, and preferences of other users. The attributes of other users 912 can be used in the selection of media playback items because the attributes of other users 912 can be used to predict what playback items the current user may like or dislike both for particular state or in general. For example, the more similarities there are between users, the more likely they may be to prefer the same kinds of media content items. The attributes of other users 912 can include attributes of other users that may be with the user while in the particular state. For example, there may be a dropping-the-kids-off-at-school state in which the user can be assumed to be traveling with children. Responsive to this determination, the selection engine 904 can refrain from selecting media content items that are explicit or otherwise unsuitable for children.

Predicted state qualities 914 can include qualities of the current or future states that may affect the kinds of media content items that the user may prefer. The predicted state qualities can include, but need not be limited to, what the state is, duration, activity, mood, location, next state, state-specific qualities, and other attributes. State-specific qualities can vary between states. For example, a state-specific quality for a travel state can include a travel destination, traffic along a travel route, a travel transportation type (e.g., public transit, personal vehicle, shared vehicle, etc.), travel transportation make, and a travel transportation model. The predicted state qualities 914 can also include combinations of states. For example, if the current state is a travel state and the predicted future state is an exercise state, then the user may prefer to listen to upbeat music to get the user in the mood for exercising. As another example, if the previous state is a work state and the current state is a travel state, then the user may prefer to listen to gentler music to relax. The selection engine 904 can select media content items for multiple, potential future states 16. For example, the user may currently be in a travel state 10, with the likely destination being a work state and with another potential destination being an exercise state. The selection engine 904 can use the predicted state qualities 914 of both the work state and the exercise state when selecting media content items. In an example, the selection engine 904 can select more media content items fitting the work state because it is more likely, and also select some media content items fitting the exercise state because it is another possibility. In another example, the selection engine 904 can select media content items that fit both within the work state and the exercise state to match the possibility of either state.

Figure 10:
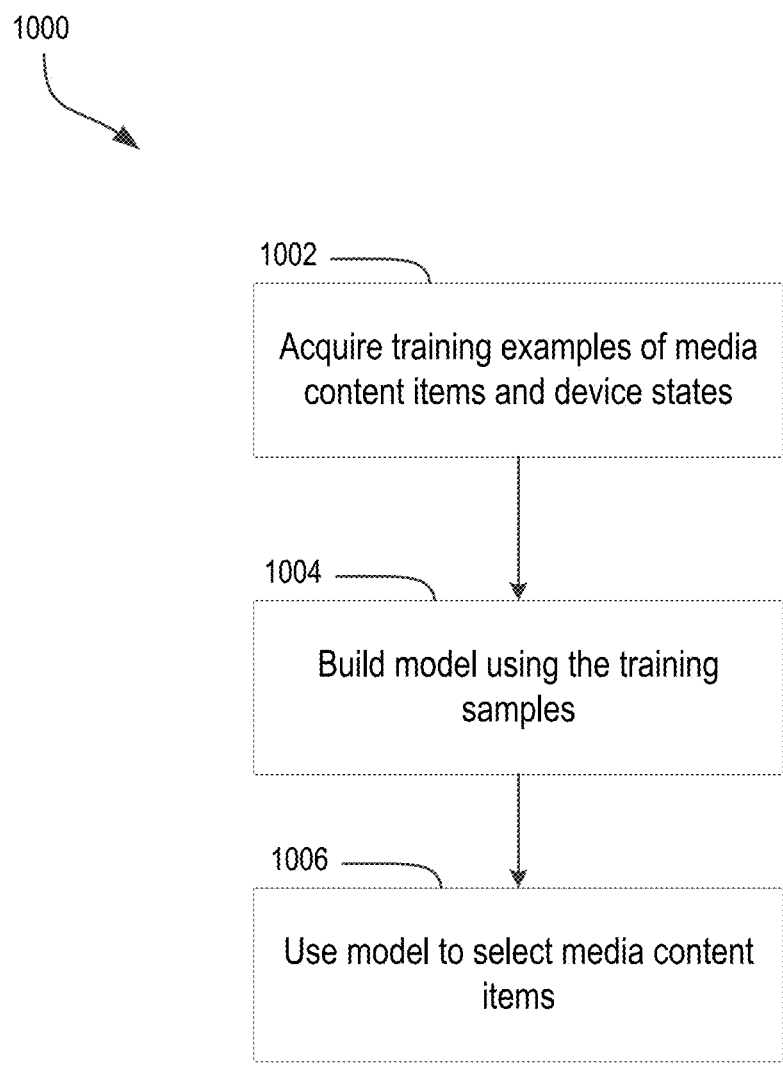
FIG. 10 is a block diagram illustrating an example process of selecting media content items.

FIG. 10 is a block diagram illustrating an example process 1000 of selecting media content items such as for the selection engine 904.

The process 1000 can begin with operation 1002, which relates to acquiring training examples of media content items and device states. In some embodiments, acquiring training examples includes acquiring files containing training examples. In some embodiments, acquiring training examples includes acquiring one or more lists of information that identifies a location of files containing the training examples (e.g., a location in the memory device 156 or the memory device 190). In an example, the training examples include states 10 and input data 902 that have positive or negative correlations with being played in respective states. For example, the training example can include data that indicates that high energy songs more positively correlate with being played in an exercise state. As another example, the training example may include data that indicates that Italian opera music may positively correlate with being played back in an Italian cooking state. The training examples can be based on data gathered from other users, such as other users sharing one or more demographic similarities with the user (e.g., location, age, music preferences, etc.). Training examples can also be based on data received directly from the user. For example, the selection engine 904 can ask the user questions, such an inquiry regarding the kinds of music that the user likes to listen to during certain activities. The responses to those questions can be used as training data. For example, the user enjoying listening to pop music while running can positively correlate to the user enjoying listening to pop music while in an exercise state and especially a running state. As another example, the selection engine 904 can use playlist data. For example, if the user has a playlist called "studying," then the music in the playlist can correlate to music that the user would enjoy while in a studying state or other similar states. Operation 1004 can follow operation 1002.

Operation 1004 relates to building a model using the training samples. In various embodiments, the model is built using one or more machine learning techniques. The model may, for example, operate to determine how similar or dissimilar the input data 902 is to particular training examples for particular media content items. Once generated, the models may be stored in memory device 156, memory device 190, or in another location, for later use to evaluate media content items. Operation 1006 can follow operation 1004.

Operation 1006 relates to using the model and input data 902 to select media content items. The input data 902 is run through the model to product one or more predictions. The one or more predictions can have a respective score expressing a confidence in the prediction being correct, such as a value expressing how similar the input data 902 is to a particular training example. Such confidence can be expressed as, for example, a percent likelihood that the user will enjoy a particular media content item given the input data 902.

One or more techniques for building models and training described in U.S. Patent Application No. 62/347,642 (previously incorporated by reference), can be similarly used by process 1000 for building models and training.

How media content items are displayed can vary across device states. For example, the media-playback engine 170 can display media content items more prominently that it predicts the user will enjoy in a particular device state. As another example, the media-playback engine 170 can represent media content items in different ways depending on whether and/or how they can be played in a particular state. For example, in certain states (e.g., an offline state), media content items that need to be streamed from the media server 180 may be unavailable to be played.

Figure 11:
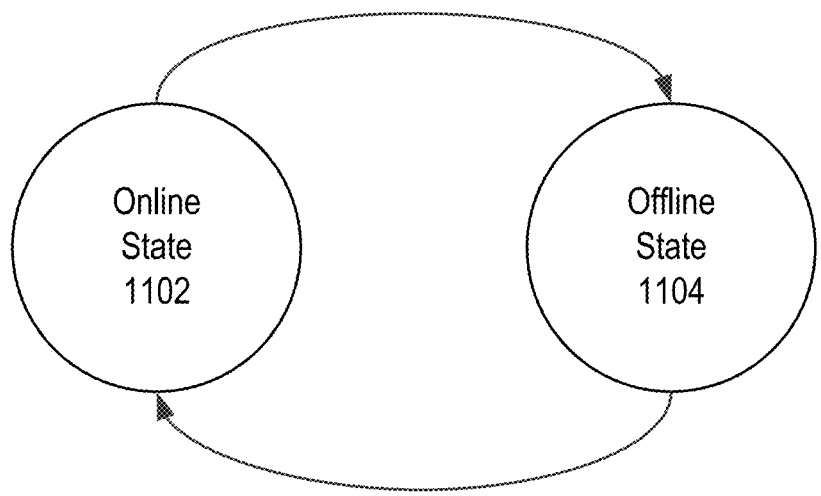
FIG. 11 is a state diagram illustrating an online state and an offline state.

FIG. 11 is a state diagram illustrating an online state 1102 and an offline state 1104. The online state 1102 may generally be any state where the device may access non-locally stored resources for media content item playback (e.g., the media-playback device 102 can stream media content items from the media server 180). The offline state 1104 may generally be any state where the device cannot access non-locally stored resources for media content item playback (e.g., the device 102 lacks Internet connectivity and cannot stream from the media server 180 or the media server is offline for maintenance).

To provide a positive user experience, it can be advantageous to make media content items available to a user across states. For example, when a user enters an offline state 1104, it can be advantageous to show the user all of the media content items that are available for playback, rather than preventing the user from playing any content. In some instances, the user may have selected particular media content items to download for playback even in an offline state 1104. In some instances, there may also be locally-cached content (e.g., because the media content item was recently played or because it was pre-fetched for playback by the caching engine 108) that can be played in the offline state 1104. In some instances, some media content items may be unavailable for playback in the offline state 1104, such as media content items that are streamed from a remote location. The media-playback device 102 can be configured to let the user see and play not only media content items that the user has selected for download, but also media content items that have been cached.

Media content items can be represented in different ways in different states. Consider an example in which there are five media content items: songs 1-5. Songs 1 and 2 are user-selected songs that were downloaded to and available for local playback from the user-selected content storage 173. Songs 3 and 4 are not stored locally and must be retrieved from the media server 180 before playback. Song 5 is not a song that the user-selected for download, but is available for local playback from the media content cache 172.

Figure 12:
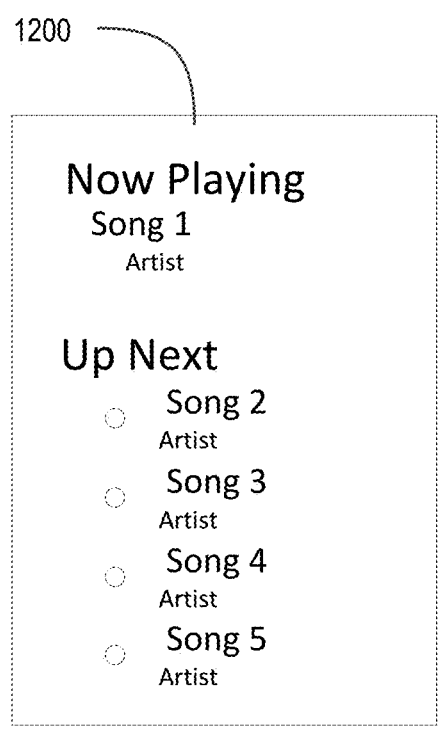
FIG. 12 is a diagram of an example user interface showing media content items with a media-playback device in an online state.

FIG. 12 is a diagram of an example user interface 1200 showing media content items with a media-playback device in the online state 1102. Here, each song 1-5 is available for playback and each song 1-5 is displayed on the user interface and available for playback.

Figure 13:
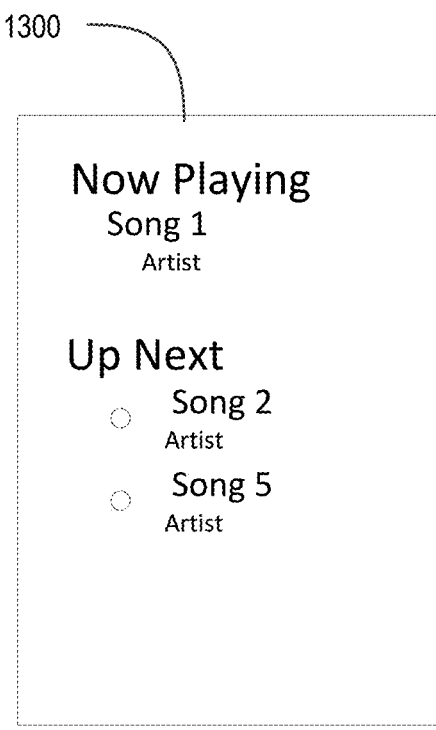
FIG. 13 is a diagram of an example user interface showing media content items with a media-playback device in an offline state.

FIG. 13 is a diagram of an example user interface 1300 showing media content items with a media-playback device in the offline state 1104. Here, only songs 1, 2, and 5 are shown because those are the only songs available for playback in the current state. The user can select and play those songs.

In an example, the media-playback device 102 can be configured to automatically switch to an offline user interface (e.g., user interface 1300) from an online user interface (e.g., user interface 1200) upon detecting or predicting that the device 102 entered an offline state. In another example, the user interfaces can be changed manually by the user (e.g., through the selection of a toggle).

Figure 14:
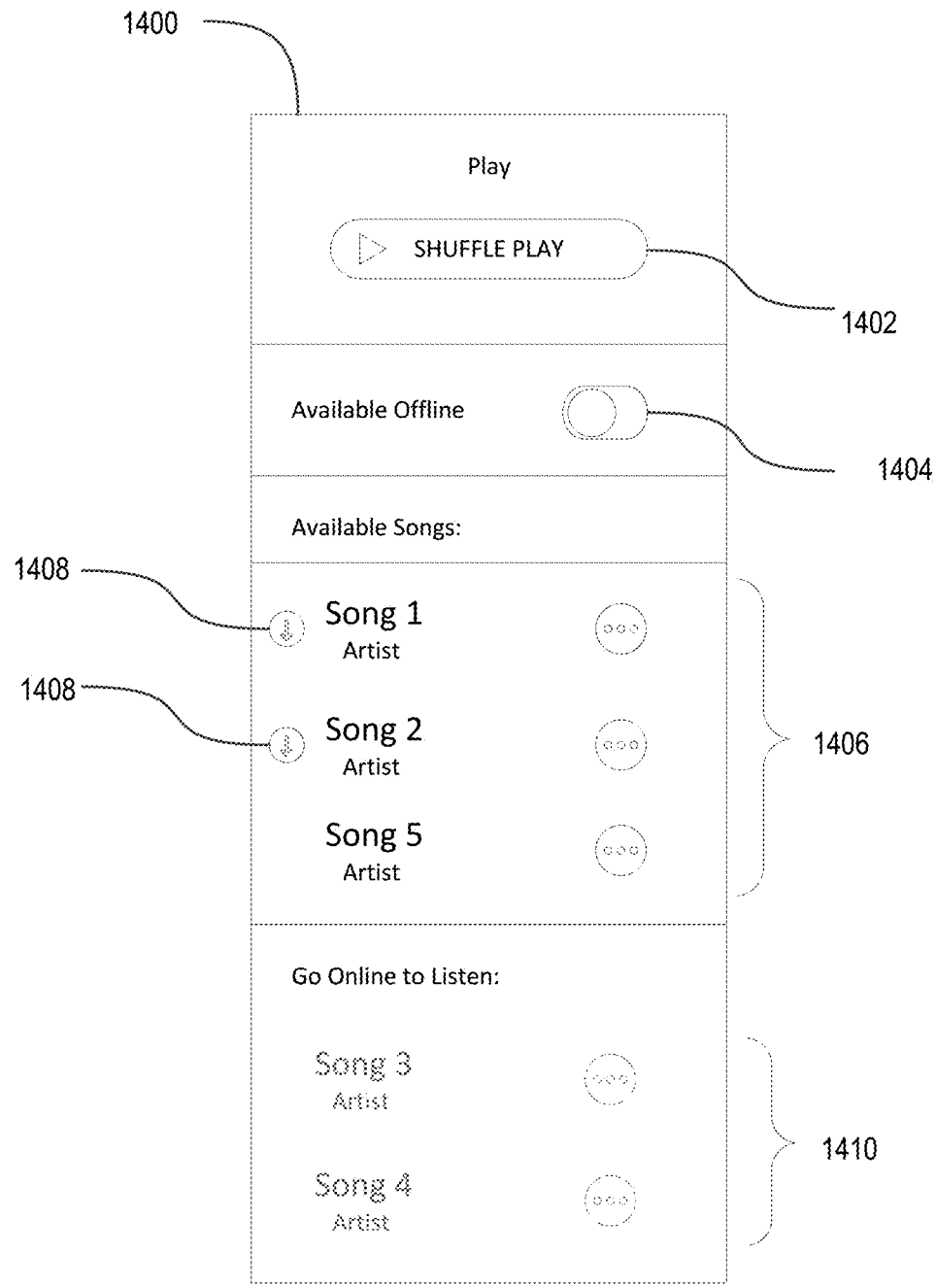
FIG. 14 is a diagram of an example user interface showing media content items with a media-playback device in an offline state.

FIG. 14 is a diagram of an example user interface 1400 showing media content items with a media-playback device in the offline state 1104. Here, the user interface 1400 includes a play button 1402 for receiving a user request to play songs, as well as a display toggle 1404 for toggling the display of only songs that are available offline. The user interface 1400 displays both cached and user-selected songs as being available to play 1406. The user interface 1400 further distinguishes user-selected media content items from cached media content items by marking the user-selected media content items with a flag indicating that these items were selected by the user (e.g., selected by the user for download and are stored locally on the media-playback device 102 in the user-selected content storage 173). In contrast to the user interface 1300, rather than not showing the songs that are unavailable to play 1410, the user interface 1400 represents them as dimmed or otherwise unavailable for selection. The user interface 1400 also represents the unavailable songs 1410 in a separate section from the available songs 1406.

The user interface 1400 can include one or more changes based on the state of the user or the playback device. For example, if the user playback device is in an offline state, then the user interface 1400 can include one or more changes to distinguish it from an online state. In an example, the text descriptor of the play button can change from "play" to "play recent" when the to-be-played media content items are cached because they were recently played by the user.

The various kinds of media content items (e.g., cached/user-selected/streaming or playable/unplayable) or device states can be distinguished from one another by modifying the user interface 1400 in a variety of ways, including but not limited to the use of: size, color, highlighting, shading, emphasis (e.g., bolding, italics, or underlining), font, indentation, location, grouping, effects, and icons or flags (e.g., a picture indicating "downloaded" may be placed next to a downloaded media content item). In another example, the media content items can be put into particular libraries or playlists. For example, there may be a local playlist that includes cached and user-selected media content items, a cached playlist, a most-played playlist, a most-popular playlist, or other playlists or libraries.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

The invention claimed is:

1. A method of media content item caching on a media-playback device, the method comprising:
    while the media playback device is determined to be in a predetermined state or is likely to enter the predetermined state within a threshold period of time,
        selecting one or more cached media content items that are missing an associated media content decryption key in a cache;
        retrieving the associated media content decryption key for each of the selected one or more cached media content items from a location remote from the media-playback device; and
        storing the retrieved associated media content decryption key for each of the selected one or more cached media content items in the cache.

2. The method of claim 1, wherein the predetermined state is a state with respect to travel, user location, Internet connectivity, Internet connectivity speed, Internet connectivity cost, Internet connectivity level, Internet connectivity type, Internet connectivity reliability, battery level, or storage space.

3. The method of claim 1, wherein the predetermined state is a state with respect to travel, and wherein predicted qualities of the predetermined state comprise one or more attributes selected from the group consisting of: a travel destination, traffic along a travel route, a travel transportation type, travel transportation make, and a travel transportation model.

4. The method of claim 1, wherein the selected one or more cached media content items are encrypted.

5. The method of claim 4, wherein the selected one or more cached content items cannot be played by the media content device without an associated media content decryption key.

6. The method of claim 4, further comprising:
    receiving a request to play a requested cached media content item, wherein the requested cached media content item is one of the selected one or more cached media content items; and
    retrieving a decryption key associated with the requested cached media content item from the cache;
    decrypting the requested cached media content item using the decryption key associated with the requested cached media content item.

7. The method of claim 1, wherein storing the retrieved associated media content decryption key for each of the selected one or more cached media content items is curated by media content key parameters.

8. The method of claim 7, wherein the media content key parameters includes length of time that decryption keys are stored and circumstances under which decryption keys are removed from the cache.

9. The method of claim 1, wherein selecting the one or more cached media content items is further based in part on one or more attributes of a user of the media-playback device.

10. The method of claim 9, wherein the one or more attributes of the user are selected from a group consisting of media content items played during previous predetermined states and playlists played during previous predetermined states.

11. The method of claim 9, wherein the one or more attributes of the user are selected from a group consisting of: age, gender, media content items for which the user has indicated an interest, media content items for which the user has indicated a disinterest, entries on the user's calendar, and a state of an application executing on the media-playback device.

12. A media-playback device comprising:
a processor; and
at least one non-transitory computer readable data storage device storing instructions that, when executed by the processor, cause the media-playback device to:
while the media playback device is determined to be in a predetermined state or is likely to enter the predetermined state within a threshold period of time,
select one or more cached media content items that are missing an associated media content decryption key in a cache;
retrieve the associated media content decryption key for each of the selected one or more cached media content items from a location remote from the media-playback device; and
store the retrieved associated media content decryption key for each of the selected one or more cached media content items in the cache.

13. The media-playback device of claim 12, wherein the predetermined state is a state with respect to travel, and wherein predicted qualities of the predetermined state comprise one or more attributes selected from the group consisting of: a travel destination, traffic along a travel route, a travel transportation type, travel transportation make, and a travel transportation model.

14. The media-playback device of claim 12, wherein the selected one or more cached media content items are encrypted.

15. The media-playback device of claim 12, wherein the instructions further cause the media-playback device to:
receive a request to play a requested cached media content item, wherein the requested cached media content item is one of the selected one or more cached media content items; and
retrieve a decryption key associated with the requested cached media content item from the cache;
decrypt the requested cached media content item using the decryption key associated with the requested cached media content item.

16. The media-playback device of claim 12, wherein store the retrieved associated media content decryption key for each of the selected one or more cached media content items is curated by media content key parameters.

17. The media-playback device of claim 16, wherein the media content key parameters includes length of time that decryption keys are stored and circumstances under which decryption keys are removed from the cache.

18. The media-playback device of claim 12, wherein select the one or more cached media content items is further based in part on one or more attributes of a user of the media-playback device.

19. The media-playback device of claim 18, wherein the one or more attributes of the user are selected from a group consisting of media content items played during previous predetermined states and playlists played during previous predetermined states.

20. The media-playback device of claim 12, wherein the predetermined state is a state with respect to travel, user location, Internet connectivity, Internet connectivity speed, Internet connectivity cost, Internet connectivity level, Internet connectivity type, Internet connectivity reliability, battery level, or storage space.

21. A media-playback server computing device in data communication with a media playback device, the media playback server computing device comprising:
a processor; and
at least one non-transitory computer readable data storage device storing instructions that, when executed by the processor, cause the media-playback server computing device to:
while the media playback device is determined to be in a predetermined state or is likely to enter the predetermined state within a threshold period of time,
select one or more cached media content items that are missing an associated media content decryption key in a cache;
retrieve the associated media content decryption key for each of the selected one or more cached media content items from a location remote from the media-playback device; and
store the retrieved associated media content decryption key for each of the selected one or more cached media content items in the cache.

* * * * *